(12) United States Patent
van Os et al.

(10) Patent No.: US 8,556,199 B2
(45) Date of Patent: Oct. 15, 2013

(54) SYSTEM, PACKAGE, APPARATUS AND METHOD FOR DOSING COFFEE BEANS

(75) Inventors: Ivo van Os, Amersfoort (NL); Philippe Jacques van Camp, Utrecht (NL); Age Willem Tanja, Burgum (NL); Gerbrand Kristiaan de Graaff, Lisse (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/151,067

(22) Filed: Jun. 1, 2011

(65) Prior Publication Data

US 2012/0091238 A1 Apr. 19, 2012

Related U.S. Application Data

(63) Continuation of application No. PCT/NL2009/050736, filed on Dec. 3, 2009.

(30) Foreign Application Priority Data

Dec. 3, 2008 (NL) .................................. 2002284
Apr. 6, 2009 (NL) .................................. 2002723

(51) Int. Cl.
*B02C 19/00* (2006.01)
(52) U.S. Cl.
USPC ............................................ 241/36; 241/100
(58) Field of Classification Search
USPC ................................................. 241/100, 36
See application file for complete search history.

(56) References Cited

U.S. PATENT DOCUMENTS

| 2,584,781 A | | 2/1952 | Beatty |
| 6,095,032 A | * | 8/2000 | Barnett et al. .................. 99/286 |
| 6,962,274 B1 | | 11/2005 | Sherman |
| 7,934,670 B2 | * | 5/2011 | Ford ............................... 241/30 |

FOREIGN PATENT DOCUMENTS

| EP | 0 409 759 A | 1/1991 |
| FR | 2755431 | 5/1998 |

OTHER PUBLICATIONS

International Search Report for PCT/NL2009/050736, mailing date of May 8, 2010, 6 pages.

* cited by examiner

*Primary Examiner* — Mark Rosenbaum
(74) *Attorney, Agent, or Firm* — Foley & Lardner LLP

(57) ABSTRACT

A system for dosing coffee beans, comprising a coffee bean package provided with at least one wall which at least partly encloses an inner space for multiple dosages of coffee beans, and a coffee bean outlet for delivering coffee beans, and an apparatus provided with a coffee bean grinder, a coffee bean inlet for supplying coffee beans from the coffee bean package to the grinder, a connecting device for connecting the coffee bean package to the apparatus, so that the coffee bean outlet can be connected to the coffee bean inlet, and a dosing device provided with a dosing space which is arranged for feeding-through one predetermined dose of coffee beans from the coffee bean outlet to the coffee bean inlet.

23 Claims, 13 Drawing Sheets

SYSTEM, PACKAGE, APPARATUS AND METHOD FOR DOSING COFFEE BEANS

CROSS-REFERENCE TO RELATED APPLICATIONS

The present application is a continuation application of International Patent Application No. PCT/NL2009/050736 filed on Dec. 3, 2009; which claimed priority to Netherlands Application No. NL2002284 filed on Dec. 3, 2008 and Netherlands Application No. NL2002723 filed on Apr. 6, 2009, all three are hereby incorporated herein by reference.

BACKGROUND

The invention concerns a system for dosing coffee beans, comprising a coffee bean package provided with at least one wall which at least partly encloses an inner space for multiple dosages of coffee beans, and a coffee bean outlet for delivering coffee beans, and an apparatus, provided with a coffee bean grinder. The invention further concerns a dosing apparatus for coffee beans, provided with a coffee bean grinder, and a coffee bean inlet for supplying coffee beans to the grinder.

The invention also concerns a coffee bean package, provided with at least one wall which at least partly encloses an inner space, and a coffee bean outlet for delivering coffee beans.

The invention furthermore concerns a method for dosing coffee beans, comprising packaging multiple predetermined dosages of coffee beans in one coffee bean package, so that ambient air is prevented from coming into contact with the coffee beans.

Existing coffee makers are, for example, filter coffee makers and espresso machines. In the case of filter coffee makers, an amount of ground coffee is placed in a filter, after which hot water is poured onto the ground coffee. Upon the water passing the ground coffee, the ground coffee is extracted and a coffee beverage is obtained, after which the coffee beverage, also referred to as filter coffee, flows through the filter while the coffee residues are left behind in the filter. It is customary for the hot water to flow through the ground coffee and the filter with the aid of gravity. After the hot water that corresponds with the amount of desired coffee beverage has been poured out over the ground coffee and has passed through the filter, the filter, at least if it is a disposable filter, can be thrown away with the ground coffee residue. Such a disposable filter typically consists substantially of paper. Also known are filters that are designed to be used more than once. After use, these filters are, for example, cleaned, so that they can be filled with a next portion of ground coffee for preparing new coffee beverage with the same filter.

In coffee making by means of espresso machines, also a filter is provided for holding an amount of ground coffee. Here, under a relatively high pressure, hot water is forced through the ground coffee and the filter. The coffee beverage thereby obtained is generally relatively thicker than filter coffee and typically has a stronger concentration of coffee extracts than filter coffee, at least, given a comparable amount of ground coffee and supplied water. Typically, a metal filter is used.

Also, coffee beverage can be obtained in a known manner with the aid of a percolator. In certain machines, such as, for example, the Senseo® coffee machine of the producers Douwe Egberts® and Philips®, for example a paper disposable filter and a metal filter holder are used. Further, instant coffee is known, where coffee concentrate or freeze-dried coffee is dissolved in hot water. In this latter method, no filter at all is used.

If a relatively long time has elapsed between the grinding of the coffee beans and the preparation of the coffee beverage with the ground coffee, there is a chance that a part of the flavor and aromas given by coffee beans is lost. Without wishing to be bound to any theory, it may be that the larger total surface of the particles of the ground coffee together, compared with the joint surface of unground coffee beans of the same weight, causes relatively more exchange between the surface and the ambient air than the total surface of the coffee beans, which can adversely affect the taste and the odor of the coffee beverage. For that reason, in current machines with grinders, the coffee beans are ground a short time before the preparation of the coffee beverage.

Incidentally, it may also be that flavors and odors connected with the coffee beans may be lost or diminish when unground coffee beans come into contact with ambient air for a long time. Generally, for that reason coffee beans and ground coffee are packaged in airtight and/or vacuum packages.

Certain coffee machines may be provided with grinders that are integrated in the coffee machine. Also, such coffee makers may be provided with coffee bean holders for feeding the coffee beans directly from the coffee bean package. Through operation of the coffee making apparatus, a part of the coffee beans from the coffee bean holder is ground, for the purpose of preparing a coffee beverage with this ground coffee. For example, the grinder is directly operated by pressing a button, whereby, for example, the number of times the button is pressed, or the length of time of pressing the button, can determine the amount of ground coffee. In automatic coffee makers with grinders, the amount of coffee beverage and the strength of the coffee beverage can be pre-selected and/or pre-set, in which case on the basis of the selected strength a dose of beans is supplied from the holder to the grinder, so that an amount of coffee is obtained that, together with the predetermined amount of water, can result in a desired amount of coffee beverage of a desired strength.

Disadvantages of the above-mentioned principles can be that an amount of coffee beans is present in the coffee maker for a long time before it is ground, as a complete pack of coffee beans is emptied into the coffee bean holder. This can adversely affect the taste and odor of the coffee beverage prepared with these coffee beans.

Also, in and around the grinder of existing coffee makers there are typically residues left of the preceding grinding runs. Study has shown that in conventional grinders typically 3-10 grams of one or more preceding grinding runs are left behind in the grinder. These remainders of a previous grinding run may subsequently be entrained in a new grinding run, which can affect the taste of the coffee beverage. Moreover, if the coffee maker is filled with new coffee beans whose taste differs from the previous filling, the remainders of the previous filling may possibly be mixed with the ground coffee of the new coffee beans, so that not the desired taste inherent to the new coffee beans can be obtained. This may be disadvantageous in particular if the user regularly wishes to change the type of coffee beans. In conventional coffee makers, the user can circumvent this problem only by dosing the coffee bean holder in each case with a small amount of coffee beans. A disadvantage involved here, however, is that the coffee bean package then is not entirely emptied into the coffee maker and is left partly filled, so that the remaining coffee beans come into contact with ambient air. Typically, the coffee beans then are stored in the meantime in a separate, preferably airtight holder, such as an airtightly closable pot or tin. These holders, however, can take up relatively much space.

In the current state of the art, after grinding and making the coffee beverage, either ground coffee is left behind in the coffee maker or coffee beans are left behind in the coffee maker, or the coffee bean package is not emptied entirely and coffee beans remain behind in the package, or separate coffee bean holders are used. There is no system that allows regularly changing taste of freshly ground coffee in an efficient and convenient manner.

SUMMARY

An object of the invention is to obviate at least one of the above-mentioned disadvantages and/or other disadvantages.

In the following description, the coffee beans or ground coffee remaining preserved or package-fresh may be understood to mean that the taste, aromas and/or volatile components of the coffee beans or ground coffee remains relatively preserved. Package-fresh in this description may additionally be understood to mean the particular condition of coffee beans shortly after the package has been opened. This package has preferably been applied in a packaging process preferably right after roasting of the coffee beans. The package is preferably airtight and/or vacuumized so that the coffee beans can be preserved better. A particular 'kind' of coffee beans may be understood to mean that the kind in question pertains to a specific coffee bean-related taste, composition of aromas and volatile components of the coffee beans, or to a particular mix, composition or blend of coffee beans, preferably as stated on the package. If in this description different kinds of coffee beans are described, it may be understood that the related taste, aromas, mix, composition or blends are different. Unless stated otherwise, in this description coffee beans are understood to be roasted coffee beans. A predetermined dose in this description may be understood to mean, for example, that the dose has been set beforehand, for example by a configuration of a circuit or mechanical system of the coffee maker determined during manufacture, or that the dose has been set by the user right before coffee making.

In a first aspect, the invention provides a system for dosing coffee beans.

With the system according to the invention, a dose of coffee beans can be delivered directly from a coffee bean package to a grinder. Before the coffee bean package is opened a first time for consumption, it is closed off to prevent contact between the coffee beans and ambient air. For example, the package is closed off airtightly and/or vacuumized and/or provided with a storage life enhancing gas and/or provided with oxygen absorbing material. The coffee beans package can be connected directly to the coffee making apparatus, whereby the coffee beans can be supplied directly from the package to the grinder. Here the package itself is connected to the coffee making apparatus, so that package-fresh coffee beans can be ground and extracted. This can benefit the taste of the coffee beverage thereupon to be prepared. Moreover, directly a coffee kind as desired can be prepared.

The coffee bean package may be provided with a coffee bean outlet, and the apparatus with a corresponding coffee bean inlet. For connecting the coffee bean package, the apparatus may be provided with a connecting device, with which the package can be connected to the apparatus. Simultaneously, the coffee bean outlet can then be connected to the coffee bean inlet. The dosing device can contribute to the feed-through of the beans from the outlet to the inlet.

The package can also be detached from the apparatus again, for instance, so that a second coffee bean package can be connected to the coffee making apparatus. Different coffee bean packages, which comprise, for example, different kinds of coffee, can be placed on the apparatus, so that in succession different coffee beverages of different tastes can be prepared. In an embodiment, the or each package can be closed off again after use, to prevent unwanted loss of coffee beans from the package, and possibly for the benefit of preserving the coffee beans in the package.

Further, the system may be provided with a dosing device for dosing coffee beans from the package, and supplying the dose to the grinder. The dosing device is provided, for example, with a dosing space for passing one predetermined dose of coffee beans from the coffee bean outlet to the coffee bean inlet. The dosing space may comprise, for example, an intermediate space, between the coffee bean inlet and the coffee bean outlet. The dosing device may also be provided with multiple dosing spaces, for example corresponding to multiple predetermined doses of coffee beans. Furthermore, the dosing device can comprise closing means which close off the outlet after the dose of coffee beans has been delivered to the dosing space, for separating the passed dose of coffee beans from the coffee beans in the package. The package may be provided with such closing means.

A predetermined dose from the package can weigh per cup of coffee beverage, for example, less than 20 grams, in particular 15 grams or less, more particularly between 4 and 10 grams, for example approximately 7 grams. The dosing space may be arranged, for example, to contain such a dose in a wholly filled condition. The dosing space can have, for example, a particular volume that corresponds to a volume amount of coffee beans, so that the amount has one of the above-mentioned weights.

The dosing device may contribute to neither more nor less than approximately a predetermined dose of coffee beans being supplied to the grinder. The dosing device may be partly included in the package and be partly included in the coffee making apparatus. With this, a predetermined dose of coffee beans can be taken from the package, with, for example, a residual part remaining behind in the package. The dosing device can, for example, close off the package after the predetermined dose has been let out of the package. For that purpose, the dosing device may be provided with means, in particular closing means, to close the coffee bean package while it is still connected to the coffee making apparatus and is not used for delivering coffee beans to the coffee making apparatus. The closing means can be deployed for separating a dose of coffee beans from the package. Also, it is possible that closure of the package occurs only when it is uncoupled from the coffee making apparatus. In a still further embodiment, the dosing device is partly present in the coffee making apparatus and partly in the package, while the two parts can cooperate with each other.

A predetermined dose of coffee beans comprises, for example, at a maximum approximately 50 grams or less, in particular approximately 25 grams or less, more particularly approximately 15 grams or less, for example approximately 7 grams, or at least between 4 and 10 grams. In an embodiment, the predetermined dose is based on an amount of coffee beans needed to prepare one cup of coffee beverage, for example coffee beverage in an amount by volume of 20 to 500 milliliters, while the strength could in part be predetermined by the user, for example through an operating element that is present on the apparatus. The predetermined dose may depend on an amount of coffee beverage and/or strength of the coffee beverage that is set by the user. The dose may be determined on the basis of e.g. weight, volume, or amount of coffee beans. It is also possible that larger amounts of coffee beverage are prepared, such as, for example, a jug of coffee.

In an embodiment, the dosing device is at least partly movable with respect to the outlet, at least when the package is coupled to the apparatus, for separating a dose of coffee beans in the dosing space from the coffee beans in the inner space of the package, Preferably, the coffee bean outlet is closed off after the dosing space is filled, so that no coffee beans can escape via the outlet anymore. For example, the dosing space is movable from a first position, in which coffee beans are loaded from the package into the dosing space, to a second position, in which coffee beans from the dosing space can be supplied to the inlet, and preferably the outlet is closed off. The apparatus may be arranged to pass the coffee beans into and out of the dosing space under the influence of gravity.

In an embodiment, the dosing device comprises a rotary element which is at least partly rotatable with respect to the coffee bean outlet, for example between the first and second position mentioned. In the first position, the outlet can, for example, be released, while in the second position the outlet can be closed off by the dosing device.

In a still further embodiment, the dosing device is so arranged that the dosing space in a first position is connected to the coffee bean outlet, in a second position is connected to the coffee bean inlet for supplying coffee beans from the dosing space to the coffee bean inlet, and preferably in a third position cooperates with a measuring device for, at least after supply of coffee beans to the dosing space, measuring whether the dosing space is provided with approximately a predetermined dose of coffee beans, with the third position preferably extending between the first and second positions. For example, the positions comprise at least two, preferably three different rotary positions of the rotary element.

In a further embodiment, the dosing device may be provided with closing means for closing off the coffee bean outlet of the coffee bean package, so that the coffee beans cannot undesirably be delivered from the package and for separating a dose of coffee beans from the package. The closing means can comprise a reclosable closure, for separating multiple doses of coffee beans from the package multiple times. The closure can preferably close off the outlet multiple times and can be provided in the package. In particular, the closure may be provided with a valve in which a passage is provided. The valve can then form the reclosable closure of the package. The valve may be movably arranged with respect to the outlet, so that the outlet is either closed off by he valve or is cleared in that the passage at least partly overlaps the outlet. In the latter position of the valve, the beans can be passed from the package into the dosing space. The valve may comprise, for example, a rotary disc, which can be rotated with respect to the outlet.

The closing means can further comprise shutoff means, which shutoff means are provided in the apparatus.

In an embodiment, the package is so closed off that at least substantially no air is passed from the environment to the beans in the package and vice versa, in any case at least when there is a pressure difference between the space in the package in which the beans are present and the environment that is at most 1.1, preferably 1.2, more preferably 1.3 and still more preferably 1.5 bar.

In a further embodiment, a measuring device may be provided that can determine whether the dosing space is at least approximately filled with the predetermined dose. An indicator may be provided which is arranged to indicate when the dosing space is not filled with the predetermined dose, so that, for example, a new package can be connected onto the apparatus for replenishing the dosing space.

In a further embodiment, the apparatus is provided with opening means for releasing, or closing off, the outlet, for example through drive of the above-mentioned reclosable closure, in particular the valve, more particularly the rotary disc. The opening means can comprise, for example, an unlocking cam for mechanically moving the closure, in particular the valve, more particularly the rotary disc, with respect to the rest of the package. The opening means may be operated, for example, automatically, through an operating mechanism, and/or manually. In an embodiment, the closure of the package is preferably operated directly manually, for example, the closure is released by rotating the package with respect to the apparatus.

For instance, the coffee making apparatus is arranged so that the closure automatically closes off the coffee bean outlet upon uncoupling of the coffee bean inlet. Also, the package, after supply of the coffee beans to the grinder, may be closed off so that the coffee beans in the package, also when the package is connected to the coffee making apparatus, can remain preserved coomparatively longer. In another embodiment, the package may be opened and/or closed manually.

In still another embodiment, the coffee bean package may be provided with guide parts for guiding and/or coupling the package into and/or with the connecting device, respectively. For instance, the bottom side of the coffee bean package may at least partly taper in the direction of the coffee bean outlet for guiding the coffee beans in the inner space to the coffee bean outlet. For instance, the package is provided with a cam and/or opening for connection to a corresponding opening and/or cam in the connecting device, respectively. For instance, the bottom of the package is conically shaped and the outlet extends approximately in the middle of the conical part.

In a second aspect, the invention provides a dosing apparatus for coffee beans.

The dosing apparatus may be provided with a coffee bean grinder, and a coffee bean inlet for supplying coffee beans to the grinder. Furthermore, a dosing space may be provided for passing a predetermined dose of coffee beans from a coffee bean package to the coffee bean inlet. For connecting the coffee bean package to the apparatus, a connecting device may be provided. The dosing space may be at least partly movably arranged with respect to the connecting device for carrying along a predetermined dose of coffee beans from the package. By, for instance, moving the dosing space with respect to the connecting device, when the package is coupled with the apparatus, the dosing space can separate the received dose of coffee beans with respect to the inner space of the package, while preferably the coffee bean outlet of the package is closed off.

The above-mentioned dosing space can be part of the dosing device. The dosing device may be provided partly in the package and partly in the apparatus. The dosing device is for instance designed with closing means which separate the coffee beans in the dosing space from the coffee beans in the inner space of the package.

The dosing apparatus is preferably part of a coffee making apparatus, so that advantageously a dose of coffee beans can be supplied to the grinder of the coffee making apparatus for preparing coffee beverage. The dosing apparatus is preferably so arranged that, in use, the grinder is only stopped when at least substantially the whole amount of coffee beans supplied to the grinder have been ground. With the aid of the dosing space, one dose of coffee beans can be supplied to the grinder. As no ground coffee is left behind, and the outlet can be closed off after each grinding run, relatively package-fresh coffee beans can be supplied to the grinder, whereby mixing with previous grindings is prevented. The dosing apparatus may be provided with different dosing spaces to allow delivery of different predetermined doses of coffee beans.

In a third aspect, the invention provides a coffee bean package.

The coffee bean package is provided with an inner space, and a coffee bean outlet for delivering coffee beans. The package may be provided with a closure, which can comprise a valve with a passage. The valve can be movably arranged with respect to the outlet for closing off, or clearing, the outlet. The outlet can either be closed off by the valve or be cleared in that the passage at least partly overlaps the outlet. If the outlet and the passage overlap each other at least sufficiently, the outlet is cleared for delivering coffee beans from the package, for instance into the dosing space.

In an embodiment, the valve can comprise a rotary disc, which rotary disc may be rotatably arranged with respect to the outlet. The rotary disc may be provided with an opening for connection to an unlocking cam which is provided in the apparatus. The unlocking cam can connect in the opening. If the package is manually rotated with respect to the apparatus, the unlocking cam can stop the rotary disc, so that the closure clears, or closes off, the outlet.

In a fourth aspect, the invention provides a method for dosing coffee beans.

In a method for dosing coffee beans, coffee beans are packaged, preferably in such a manner as to prevent ambient air coming into contact with the coffee beans. Preferably, multiple dosages of coffee beans are packaged in one package, for obtaining multiple portions of coffee from the package. The package is preferably so arranged as to be directly connectable to an apparatus with a coffee bean grinder. In this connected condition, one predetermined dose of coffee beans from the package can be supplied to the grinder, while a residual amount of coffee beans remains behind in the package. Preferably, the residual amount of coffee beans can remain behind in the package in that the outlet of the package, in a condition where no coffee beans are being delivered from the package, can be closed off. The closure can separate the dose of coffee beans that has been delivered from the remaining coffee beans in the package.

In coupled condition of the coffee bean package with the apparatus, a dose of coffee beans can be delivered from the package to the apparatus. The dose of coffee beans can be loaded from the package into a dosing space, or an intermediate space. The dosing space is then connected to the outlet of the package, and a closure can clear the dosing space to that end. When the dose of coffee beans has been loaded into the dosing space, the dosing space can be closed off again from the inner space of the package, so that the dose of coffee beans in the dosing space is isolated from the coffee beans in the inner space of the package. For instance, the dosing space can move with respect to the outlet, preferably towards the coffee bean inlet, for supply of the dose of coffee beans to the grinder. Preferably, the dose of coffee beans is supplied to the inlet under the influence of gravity.

In an embodiment, the coffee bean package can be taken off the apparatus, for instance after a dose of coffee beans from the coffee bean package has been supplied to the grinder, and the outlet is closed off again. By closing off the outlet upon removal of the package, coffee beans can be prevented from falling out of the package after removal. For instance, different coffee bean packages with different kinds of coffee beans can be connected one after the other to the coffee making apparatus, while each kind of coffee beans can be supplied package-fresh to the grinder. In yet another embodiment, the package is closed off after a dose of coffee beans has been passed out of it. Advantageously, the package can be closed off substantially airtightly. As a result, the package can be connected to and uncoupled from the apparatus multiple times, while the coffee beans packaged therein can remain substantially package-fresh.

BRIEF DESCRIPTION OF THE DRAWINGS

Further embodiments and effects according to the invention are set forth in the subclaims and will also appear from the description, in which the invention is described in more detail in multiple exemplary embodiments with reference to the appended drawings, in which:

DETAILED DESCRIPTION OF THE INVENTION

Figure 1:
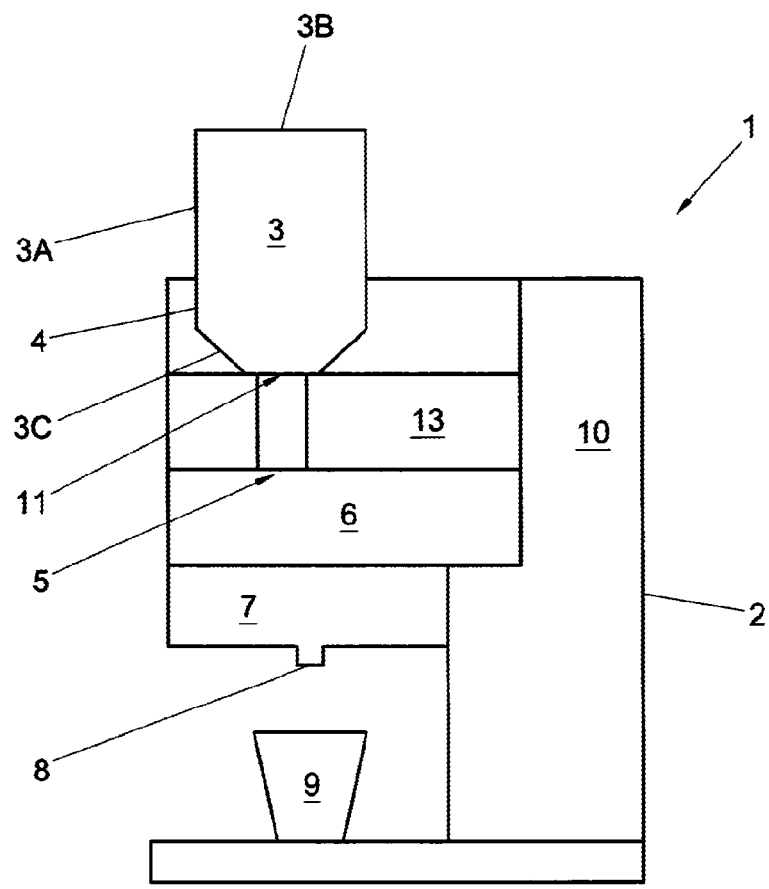
FIG. 1 shows in side elevation a schematic diagram of a cross section of a system for dosing coffee beans.

In this description the same or corresponding parts have the same or corresponding reference numerals. In the drawing, embodiments are shown only by way of example. The elements used in them are mentioned only as examples and should not be construed as limiting the invention. The proportions of the embodiments shown in the figures may be represented schematically and/or exaggeratedly and should not be construed as limiting.

In this description, in particular, reference is made to a package for coffee beans. However, this description does not relate to just whole coffee beans. Coffee beans are to be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package are divided into about thirty or less, in particular about fifteen or less, more particularly about ten fragments or less. One coffee bean fragment then comprises, for instance, one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be the case with whole coffee beans. On the other hand, less bean surface will come into contact with air than would be the case with ground coffee, so that coffee bean fragments can be preserved relatively better than ground coffee beans. Only just before preparation of the coffee beverage are the coffee bean fragments ground for obtaining coffee beverage. In this description, therefore, coffee bean may also be understood to include a fragmented coffee bean, which, though, is still to be ground for preparing the desired coffee beverage.

In FIG. 1 a system 1 for preparing coffee beverage is shown. The system comprises a coffee making apparatus 2 and a coffee bean package 3. A connecting device 4 may be provided for preferably directly connecting the coffee bean package 3 onto the coffee making apparatus 2.

The coffee bean package 3 has an inner space which at least before use is filled with the coffee beans. The inner space may, for instance, be enclosed by at least one circumferential wall 3A, a top wall 3B and a bottom 3C. Optionally, the top wall 3B can comprise a cover, or be absent. Preferably, the coffee bean package 3, at least before it is placed on the coffee making apparatus 2, is in itself closed off such that exposure of the coffee beans to ambient air is prevented. Preferably, to that end, the package 3 is closed off airtightly and/or vacuumized. The coffee bean package 3 can be a disposable package and/or, for instance, be manufactured substantially from paper and/or foil and/or cellulose and/or plastic and/or tin, while the package 3, after being emptied, can be thrown away.

The connecting device 4 may be arranged for receiving the coffee bean package 3 in whole or in part. In an embodiment, the coffee bean package 3 is provided, for instance, with relatively stiff guide parts, which can serve as a guide along the connecting device 4, for connecting the coffee bean package 3 to the coffee making apparatus 2. For instance, the connecting device 4 and the package 3 are provided with corresponding guide parts, while the guide parts can comprise, for example, a cam, screw thread, a snap connection, a bayonet closure or other connection possibility.

In an embodiment, a coffee bean inlet 5 is provided for supply of the coffee beans from the coffee bean package 3 to a grinder 6, when the package 3 is connected to the coffee making apparatus 2, and when the outlet 5 is positioned in a release position. In the coffee making apparatus 2, between the coffee bean inlet 5 and the grinder 6, a coffee bean transport path may extend. The grinder 6 is arranged for grinding the coffee beans to obtain ground coffee. The ground coffee can be supplied to a coffee preparation device 7. The coffee preparation device 7 is arranged for preparing coffee beverage, with supply of water to the ground coffee. A coffee outlet 8 is provided for dispensing the coffee beverage, preferably to a cup 9, mug, pot or thermos bottle or the like, placed under the coffee outlet 8. The coffee preparation device 7 can for instance be arranged to supply hot water under pressure, as in an espresso machine, and/or be arranged as a pour-on system, or at least as a coffee maker without use of excess pressure, as, for instance, with a filter coffee maker. Also, the coffee preparation device 7 may be arranged to prepare the coffee beverage under slightly elevated pressure in the order of 1.1-2, in particular 1.1-1.5 bar. A water provision 10 may be provided for furnishing water, preferably hot water, for the preparation of coffee beverage. For heating the water, at least a heat element may be provided.

The grinder 6 of the apparatus 2 is preferably so arranged that the coffee making apparatus comprises at least substantially no ground coffee anymore after grinding has stopped. The apparatus 2 may be provided with a coffee bean transport path which extends from the coffee bean inlet 5 to the grinder 6, while the apparatus 2 may be so arranged that after preparing the coffee beverage, substantially no unused ground coffee or coffee beans are left behind in the grinder 6 and in the coffee bean transport path. In particular, the apparatus 2 may be so arranged that, in use, the grinder 6 is only stopped when at least substantially the whole dose of coffee beans supplied to the grinder 6 have been ground. Moreover, the apparatus 2 may be so arranged that, in use, the ground coffee is transported from the grinder 6 to the coffee preparation device 7 under the influence of gravity. In particular, the apparatus 2 may be so arranged that the ground coffee beans can be transported from the coffee bean package 3 to the grinder 6 under the influence of gravity.

In an embodiment, the package 3 may be provided with a coffee bean outlet 11 for passing coffee beans from the package 3. The system 1 may be provided with a dosing device 13 for dosing coffee beans from the package 3 to the grinder 6. To that end, the dosing device 13 may be provided with a movable dosing space 14, for holding one predetermined dose of coffee beans, and comprise closing means 12 for closing off the outlet 11, for preventing more coffee beans than the predetermined dose from being delivered out of the package 3. The apparatus 2 may be provided with the dosing space 14. The outlet 11 can be coupled via the dosing space 14 with the inlet 5 for supplying coffee beans from the inner space of the coffee bean package 3 to the grinder 6. The dosing device 13 may be at least partly movably arranged, for instance between a position in which the outlet 11 is coupled with the dosing space 14 while the inlet 5 is closed off from the dosing space 14, and a position in which the inlet 5 is coupled with the dosing space 14 while the outlet 11 is closed off from the dosing space 14.

The guide parts of the package 3 can comprise, for instance, stiff walls, or a conically shaped wall around the coffee bean outlet 11, so that the coffee bean outlet 11 can be guided in the desired position with respect to the apparatus 2. The system 1 is so arranged, for instance, that the coffee bean outlet 11 can be manually coupled to and/or uncoupled from the connecting device 4 for connecting with each other and/or separating from each other the coffee bean package 3 and the coffee making apparatus 2.

The dosing device 13 may be provided with closing means 12 for closing off the outlet 11. The closing means 12 can open for delivering coffee beans from the package 3 to the grinder 6, via the dosing space 14. After delivery of the coffee beans the closing means 12 can close the package again. The opening of the closing means 12 can be carried out with opening means 12C, which can be operated, for instance, by hand. Also, the system 1, in particular the coffee making apparatus 2, may be provided with the opening means 12C for opening the closing means 12. For instance, the closing means 12 comprise shutoff means 15 which are provided in the apparatus 2, and/or the closing means 12 comprise a closure 12A which is provided in the package 3.

The closure 12A can close off the package 3, or at least the outlet 11 in uncoupled condition, so that no coffee beans fall out of the outlet 11 upon removal of the package 3. Also, the closure 12A can prevent coffee beans from being passed from the package 3 into the dosing space 14. The closure 12A and/or the shutoff means 15 may be of such strong design that if a coffee bean were to be situated in the opening to be closed off, the respective closing means will break this bean to be able to close off the opening wholly anyhow.

Figure 2C:
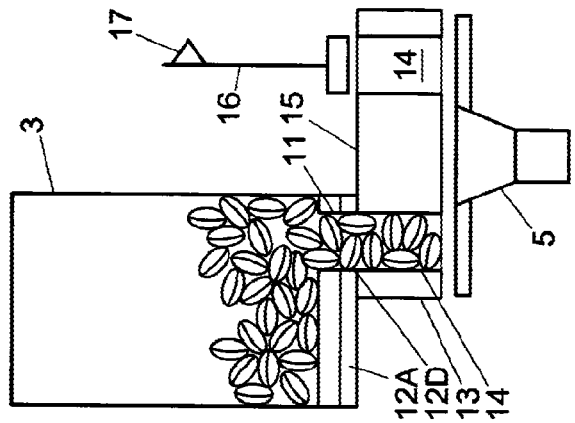
FIGS. 2A-F in steps show schematically cross sections of parts of a dosing system.
Figure 2B:
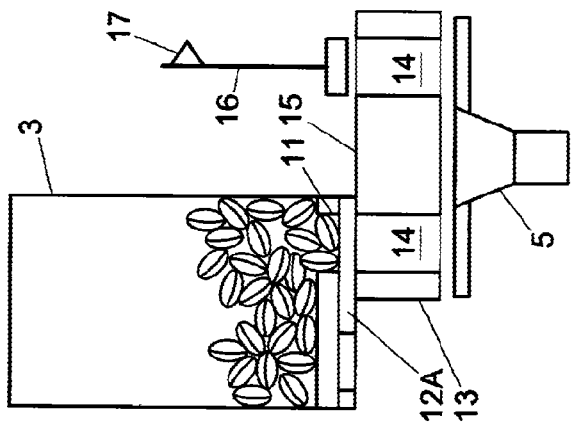
Figure 2A:
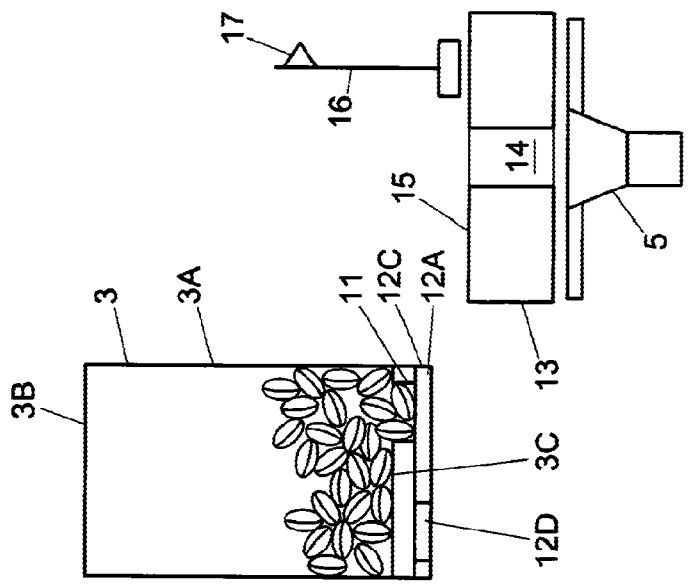

In an embodiment, the coffee bean package 3 is provided with a closure 12A for closing off the coffee bean outlet 11 when the coffee bean outlet 11 is uncoupled from the coffee bean inlet 5, as is shown, for example, in FIG. 2A. The closure 12A may close off the coffee bean package 3 also when the package 3 is connected to the coffee making apparatus 2, for instance while the dosing space 14 and coffee bean outlet 11 are coupled, so that also during coupling of package 3 and apparatus 2 contact between the coffee beans and the ambient air can be prevented (see FIGS. 2B, 2D-F).

In an embodiment, the closure 12A comprises a passage 12D. The closure 12A can comprise a valve, preferably in the form of a rotary disc. The closure 12A can be operated, manually and/or by the apparatus 2, for clearing, or closing off, the coffee bean outlet 11. For clearing the outlet 11, the passage 12D may, for example, be placed in a condition at least partially overlapping the outlet 11, as shown, for example, in FIG. 2C. The passage 12D and the outlet 11 may be arranged, for example, near the side, in particular the circumferential wall 3A, in the bottom 3C, so that the passage 12D can traverse a circular path when the closure 12A is rotated. For example, the passage 12D may be positioned such that coffee beans are passed through the outlet 11 under the influence of gravity and also through the passage 12D, at least in a release condition of the closure 12A, so that the beans are taken up in the dosing space 14. By thereupon moving the closure 12A again, the passage 12D can be brought out of the overlapping condition, as is shown, for example, in FIG. 2A, so that the outlet 11 is closed off again and further no beans can be delivered to the dosing space 14 anymore. For example, the closure 12A can be rotated between a position in which the outlet 11 is cleared, and a position in which the outlet 11 is closed off. The closure 12A can preferably close off the outlet 11 multiple times.

In an embodiment, the closure 12A in a closed-off condition of the outlet 11 can pass at least substantially no air from the environment to the beans in the package and vice versa when there is a pressure difference between the space in the package in which the beans are present and the environment that is at most 1.1, preferably 1.2, more preferably 1.3 and still more preferably 1.5, bar.

In FIG. 2A there is schematically shown a coffee bean package 3, which can be connected to the dosing device 13. The dosing device 13 is provided with a dosing space 14 which is arranged for passing-through a predetermined dose of coffee beans from the coffee bean outlet 11 to the coffee bean inlet 5. As shown in FIGS. 2A-C, the dosing device 13 can be at least partly movably arranged. The dosing device 13 is preferably at least partly movably arranged with respect to the outlet 11 in a coupled condition of the package 3. For example, the dosing device 13 may be so arranged that the dosing space 14 in a first position is situated under the outlet 11, so that a dose of coffee beans can be supplied from the outlet 11 to the dosing space 14, at least via the passage 12D, if the passage 12D overlaps the outlet 11. This is shown in FIGS. 2B-D. The closure 12A can close off the outlet 11 or release it for delivering coffee beans from the package 3 to the dosing space 14, if the dosing space 14 is situated under the outlet 11.

Figure 2F:
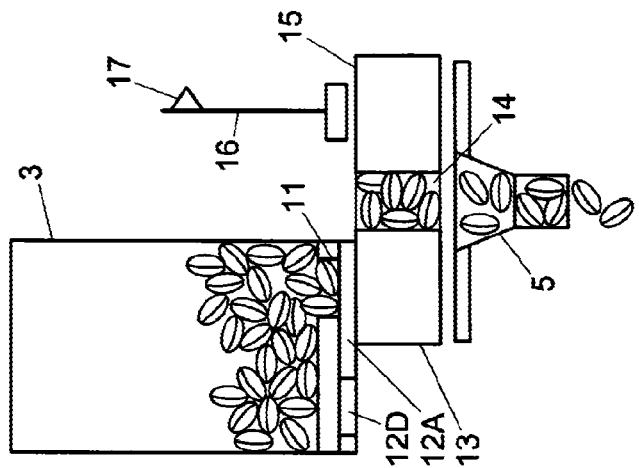
Figure 2E:
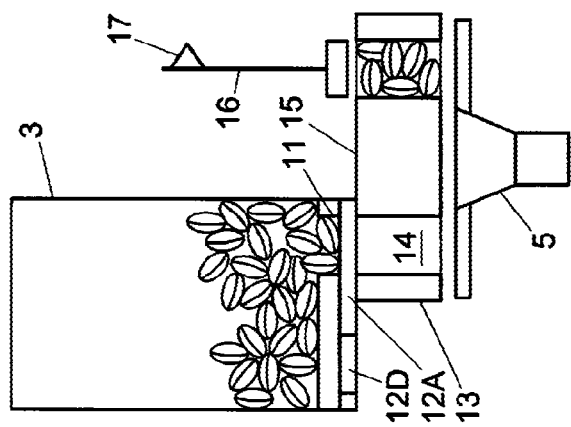
Figure 2D:
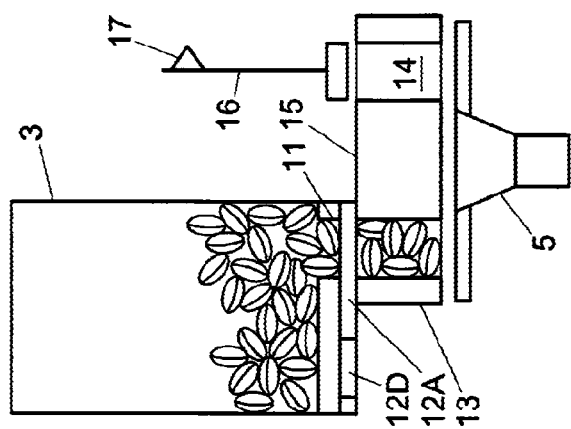

In a second position of the dosing device 13, the dosing space 14 is, for instance, connected to the coffee bean inlet 5, for supplying the coffee beans from the dosing space 14 to the grinder 6, as is shown, for instance, in FIG. 2F. In the second position, the dosing space 14 is, for instance, positioned above the outlet 5, so that the coffee beans from the dosing space 14 can be passed under the influence of gravity to the outlet 5 and/or the grinder 6. As shown in FIGS. 2A-F, the dosing device 13 can comprise a rotary element with the dosing space 14, the rotary element being rotatable at least between the first and second positions mentioned. Additionally, the dosing space 14 can be positioned in a third position, for determining whether the dosing space 14 contains the correct dose. The dosing space 14 can move from the first position to the third position, for determining whether the desired dose is present in the dosing space 14, and then to the second position, for delivering the preferably desired dose. This third position is shown in FIG. 2E and is described more extensively below.

The dosing device 13 may be so arranged that the coffee beans in the dosing space 14 can be separated from the coffee beans in the inner space of the package 3. To this end, the dosing space 14 can, for instance, move in a direction away from the outlet 11, for instance from the above-mentioned first to the above-mentioned second position, so that a top surface of the dosing device 13 closes off the outlet 11 and, so doing, can function as shutoff means 15 for the outlet 11. Additionally, or instead, the closure 12A can close off the outlet 11 for separating the coffee beans in the package 3 from the coffee beans in the dosing space 14. In an embodiment, the dosing device 13 comprises the above-mentioned opening means so that upon moving of the dosing device 13 the opening means operate the closure 12A.

In an embodiment, the dosing device 13 is provided with a measuring device 16. The measuring device 16 may be arranged for determining whether the dosing space 14 is filled with a predetermined dose. In an embodiment, the predetermined dose can be set during manufacture. In another embodiment, during manufacture, multiple predetermined dosages may be set, while the apparatus 2 may be provided with an operating element for allowing the user to choose from the possible predetermined dosages of coffee beans, while the measuring device 16 is arranged to be able to determine, during use, whether the dosing space 14 is filled with the dose selected by the user. Also, it is possible that multiple predetermined dosages can be chosen by the user by providing the dosing device 13 with different dosing spaces 14 of different volumes, corresponding to different predetermined dosages. In a further embodiment, the user himself can determine the dose of coffee beans during use, preferably within a predetermined range, and the measuring device 16 is arranged to determine whether the dosing space 14 comprises the dose of coffee beans determined by the user. The measuring device 16 can include, for example, an optical sensor and/or a distance sensor, allowing the filling height in the dosing space 14 to be determined. In this way, the volume of the dose of coffee beans in the dosing space 14 can be determined, from which, for example, also the weight of coffee beans can be derived. In a still further embodiment, the measuring device 16 comprises a weight sensor, which can measure the weight of the coffee beans in the dosing space 14, to be able to determine the dose of coffee beans on the basis of weight. The measuring device 16 can also comprise, for example, a mechanical sensor and/or a pressure sensor, with which, for example, the filling height and/or the weight of the coffee beans in the dosing space 14 can be determined. The measuring device 16 can extend, for example, near the dosing space 14. For example, the dosing space 14 and the measuring device 16 are movable relative to each other, such that in a third position the dosing space 14 allows the measuring of the filling by the measuring device 16, as is shown, for example, in FIG. 2F. The third position can comprise, for example, a rotary position that is positioned between the earlier-mentioned first and second positions of the dosing device 13.

In a comparable manner, a second measuring device may be provided, capable of measuring the amount of coffee beans in the package 3, at least when the package 3 is coupled with the apparatus 2. With this, the user may, for instance, be warned in a timely manner that the coffee bean package 3 is nearly or wholly empty.

In an embodiment, the apparatus 2 is provided with an indicator 17, which may at least be arranged to indicate to the user whether or not the dosing space 14 has been filled in accordance with the predetermined dose of coffee beans. If the dosing space 14, for example after delivering coffee beans from the package 3, has not been filled in accordance with the predetermined dose, the indicator 17 can indicate this, for example, in a visual and/or auditory manner, for example on the basis of a signal that has been obtained from the measuring device 16. This can also mean that the coffee bean package 3 is empty and should be replaced, so that the dosing space 14 can be filled with coffee beans from a new package 3 until the predetermined dose is achieved. The indicator 17 can issue a signal on the basis of a signal from the measuring device 16 and/or the second measuring device.

The system 1 and a method for dosing can be described, with reference to FIGS. 2A-F, as follows. In FIG. 2A a closed coffee bean package 3 is shown, which is not yet connected to the dosing device 13. The coffee beans preferably have already been packaged prior to supply of the package 3 to the user in a preferably substantially gas-tight package 3 and/or vacuum package 3. The package 3 may be provided with a valve for allowing relief of gases that may be released in the package 3 and could cause an excess pressure in the package 3. The package 3 is provided with a closure 12A which, at least before use, allows substantially no air to pass from the environment to the beans in the package 3 and vice versa. After opening of the closure 12A, the closure 12A can preferably close off the outlet 11 several more times.

As can be seen in FIG. 2B, the closed package 3 is coupled with the apparatus 2 so that the outlet 11 can be connected to the dosing space 14, or at least one of the dosing spaces 14. In the embodiment shown, the dosing device 13 comprises multiple dosing spaces 14, for example corresponding to different predetermined doses of coffee beans. The connecting device 4 and/or the guide parts are preferably so arranged that the outlet 11 can be coupled with the dosing space 14. Preferably, the outlet 11, in coupled condition and in an upright condition of the apparatus 2, extends above the dosing space 14, so that the coffee beans can be supplied to the dosing space 14 under the influence of gravity. Since in the position shown in FIG. 2B, the outlet 11 has not yet been cleared by the closure 12A, no coffee beans are passed from the inner space to the dosing space 14 yet.

In FIG. 2C it can be seen that the outlet 11 is released by the closure 12A, in particular in that the closure 12A is rotated so that the passage 12D overlaps the outlet 11, so that the coffee beans can fall under the influence of gravity out of the inner space, through the outlet 11 and the passage 12D, into the dosing space 14. To this end, the passage 12D at least partly overlaps the dosing space 14. Preferably, the rotary disc is so positioned that the passage 12D extends approximately straight under the outlet 11, and approximately straight above the dosing space 14.

In different embodiments, the release of the outlet 11 can proceed in different ways. For example, the closure 12A may be driven manually or through the apparatus 2. The apparatus 2 may be provided with opening means 12C which engage the closure 12A for moving the closure 12A, while the opening means can be driven, for example, by a motor and/or manually. In an alternative embodiment, the apparatus is provided, in addition to or instead of the closure 12A, with shutoff means 15, for example in the form of the top surface of the dosing device 13, while the shutoff means 15 can in principle be driven in a comparable manner, for instance by hand or by motor. In another embodiment, which is described below with reference to FIGS. 5A-G, for example, the outlet 11 can be rotated in the direction of the passage 12D, so that the coffee beans are delivered, for example in an automatic or manual manner. For example, the closing means 12 can be moved with respect to the package 3 and/or the package 3 with respect to the closing means 12, for clearing, or closing off, the outlet 11.

As can be seen in FIG. 2D, the beans in the dosing space 14 can be separated from the beans in the inner space of the package 3. To this end, for example, the closure 12A can close off the outlet 11 again. The package 3 can then, for example, be taken off the apparatus 2 in closed condition. The dosing space 14 with the received dose of coffee beans can be moved, for example, in the direction of a position in which the measuring device 16 can measure the filling of the dosing space 14 (FIG. 2E), and/or in the direction of a position for supplying the dose of coffee beans to the grinder 6 (FIG. 2F). As can be seen in FIG. 2E, the dosing space 14 can be rotated so that the dosing space 14 extends near the measuring device 16, for measuring of the filling of the dosing space 14. If the measuring device determines a dose of beans that is approximately equal to a predetermined dose, the dosing space 14 can be rotated to the position in which the dose of coffee beans can be delivered to the inlet 5 (FIG. 2F). If a different amount of coffee beans than the predetermined dose of coffee beans is determined by the measuring device 16, or an empty dosing space, then the measuring device 16 can, for example, deliver a signal to the user, for example via the indicator 17, or to the apparatus 2, for example for the purpose of achieving the desired dose still. For example, the package 3 is then changed and/or the dosing space 14 is again connected to the outlet 11.

In FIG. 2F, there is shown that the dosing space 14 delivers the coffee beans via the inlet 5 to the grinder 6. Preferably, the dosing space 14 is so placed with respect to the inlet 5 that the coffee beans are passed into the inlet 5 under the influence of gravity. In particular, to that end, the dosing space 14 is positioned above the inlet 5.

Instead of movement of the dosing space 14, for example second closing means may be provided for releasing the dosing space 14 in the direction of the inlet 5. Correspondingly, the shutoff means 15 can close off the outlet 11, while the shutoff means 15 and/or the second closing means can be regarded as movable parts of the dosing device 13.

In an embodiment, the outlet 11 is preferably substantially continuously closed off in both coupled and uncoupled condition of the package 3, apart from the position in which the coffee beans from the inner space are delivered to the dosing space 14, as shown, for example, in FIG. 2C, so that the coffee beans in the package 3 can remain relatively preserved.

In FIG. 3, an alternative embodiment of a system 1 is shown. The package 3 is for instance provided with a bottom 3C which tapers at least slightly in the direction of the outlet 11, so that the bottom 3C is at least partly conical. With this, the beans can collect under the influence of gravity relatively low down in the package 3, preferably against the closing means 12 of the outlet 11, so that also the last beans are passed through the outlet 11 upon opening of the outlet 11. For example, the apparatus 2 is provided with shutoff means 15, which are arranged to close off and open the outlet 11. The package 3 may be provided with a closure 12A. For example, the closure 12A is arranged to be opened manually before placement on the apparatus 2, and/or the closure 12A is reclosably arranged, to be opened by the apparatus 2 and/or manually.

Figure 3A:
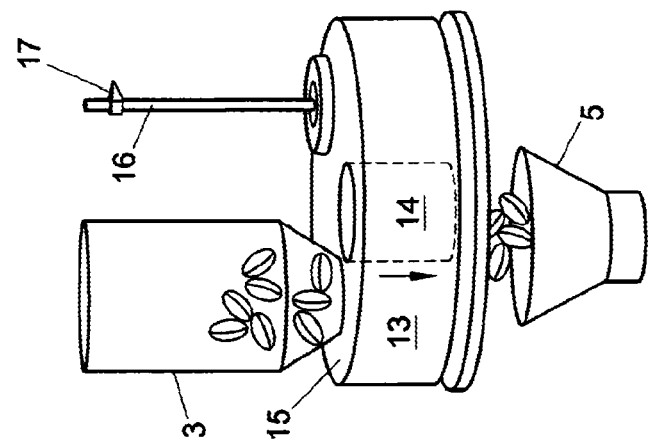
FIGS. 3A-C in steps show schematically cross sections of parts of another dosing system.

The dosing device 13 can comprise a rotary element, which is movably arranged. The shutoff means 15 may be arranged at the upper surface of the rotary element. The dosing device 13 may be approximately arranged according to a similar principle to that described above in relation to FIGS. 1 and 2A-F. In FIG. 3A the system 1 is shown in a delivery position, in which the coffee beans are delivered from the package 3 to the dosing space 14. For this purpose, the outlet 11 and the dosing space 14 preferably connect with each other, so that the beans from the package 3 can be passed along the bottom 3C into the dosing space 14.

Figure 3B:
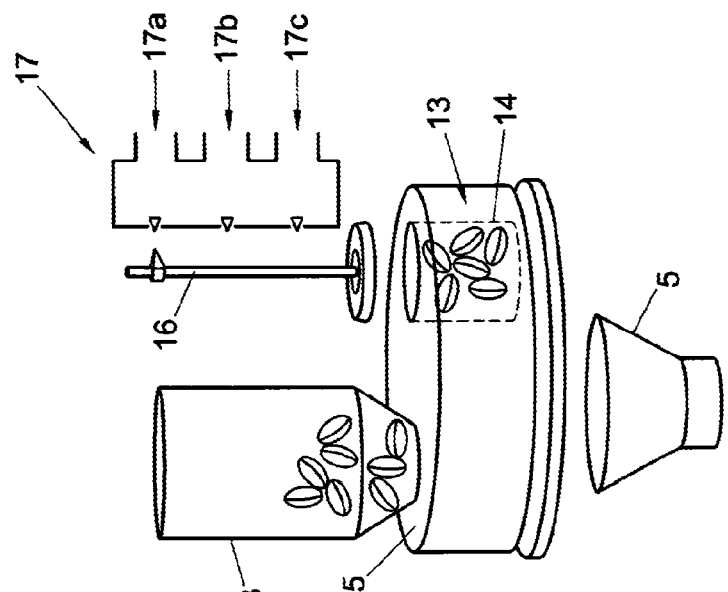
Figure 3C:
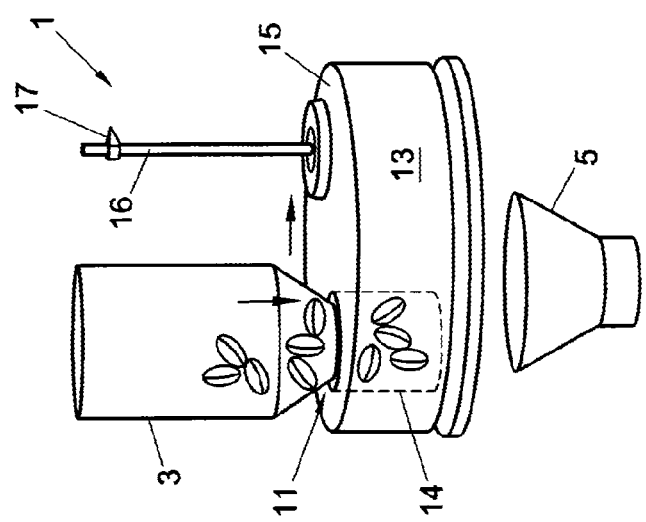

When the dosing space 14 is filled, the shutoff means 15 can close off the outlet 11, for example by movement of the dosing space 14. This is shown in FIG. 3B. For example, the dosing space 14, after filling thereof, is so positioned that the measuring device 16 can determine the dose of coffee beans present in the dosing space 14, at least, the volume, the weight and/or the filling height thereof. The measuring device 16 can comprise, for example, a mechanical sensor which measures the height of the filling level of the beans in the dosing space 14. The measuring device 16 can, for example, control the indicator 17 for representing whether the dosing space 14 is filled with the predetermined dose (17A), and/or is filled with only a part of a predetermined dose (17B), and/or is substantially empty (17C). If it is measured that the dosing space 14 is substantially empty, the indicator 17 can indicate, for instance, that the package 3 is substantially empty, so that the user can take the empty package 3 off the apparatus 2 and can connect an at least partly filled package 3 to the apparatus 2. After that, dosing and coffee making can be resumed. Also when the dosing space 14 contains only a part of a predetermined dose because the package 3 contained less than the predetermined dose, the user may choose, for example, to replace the empty package 3 with a second at least partly filled package 3, so that the dosing space 14 can be filled to the predetermined dose through a second delivery. In a next position (FIG. 3C), the dosing space 14 is, for example, connected to the inlet 5 so that the coffee beans are passed out of the dosing space towards the grinder 6. In-between the different deliveries to the dosing space 14, the outlet may be closed off by the closing means 12, in particular the shutoff means 15.

In yet another embodiment, the measuring device 16 is provided near the dosing space 14, at least in the first position, where the dosing space 14 can be connected to the outlet 11. Such a measuring device 16 may be arranged to determine and compare the amount of coffee beans during the filling of the dosing space 14. The measuring device 16 may be arranged to close off the outlet 11, with the closing means 12, when substantially the predetermined dose of coffee beans is achieved. A measuring device 16 according to the invention comprises, for example, a microprocessor and/or a memory and a connection possibility for connection to a power source.

Figure 4A:
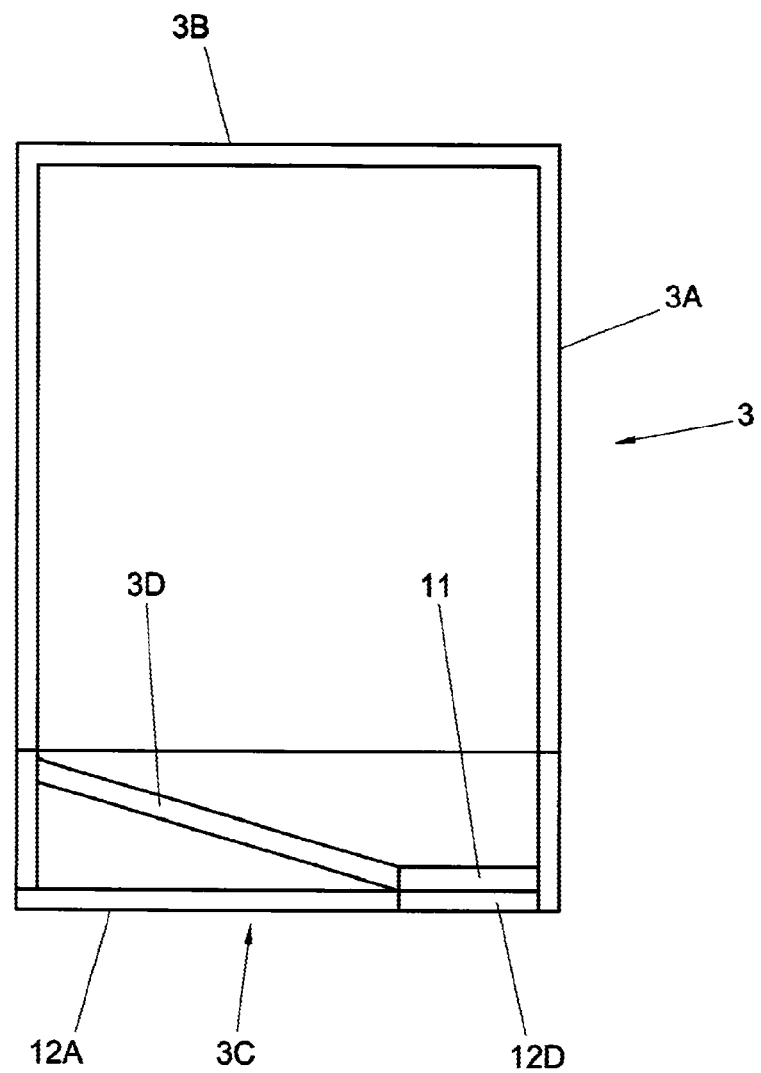
FIG. 4A shows schematically in side elevation a cross section of a coffee bean package.
Figure 4B:
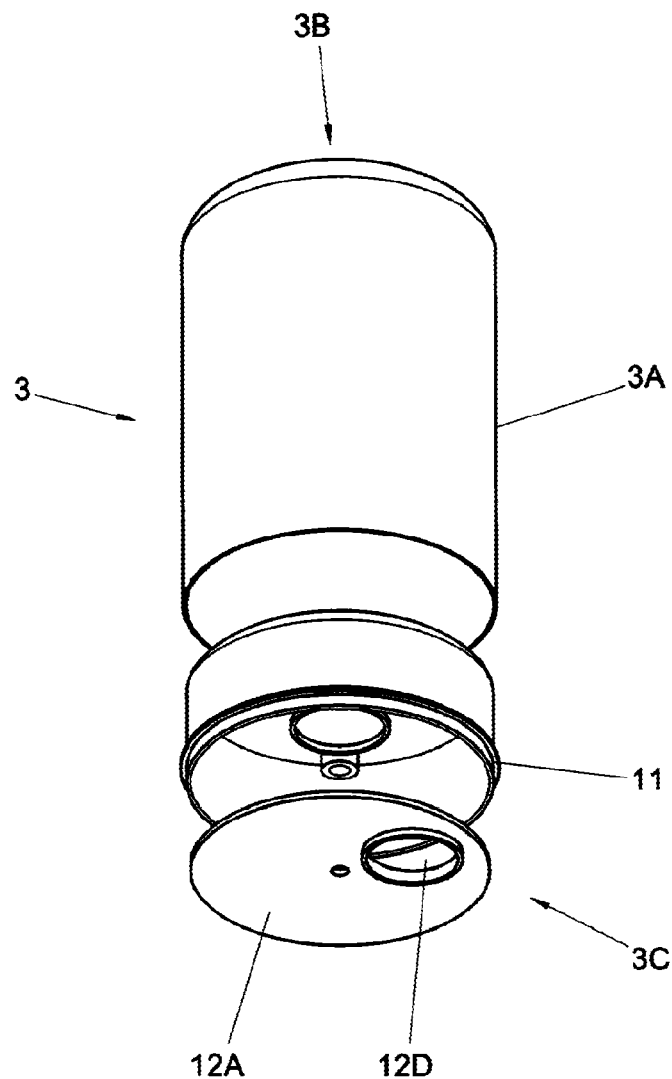
FIG. 4B shows an exploded view in perspective of the coffee bean package according to FIG. 4A.

In an embodiment, the package 3 comprises an underside that tapers in the direction of the outlet 11 for guiding the coffee beans in the inner space to the outlet 11, for instance as shown in FIGS. 4A and 4B. In particular, to that end, a lower boundary 3D of the inner space can taper or slope, more particularly in the form of a funnel with an outlet 11 near the side. As the lower boundary 3D of the inner space tapers, it can be achieved that also the last coffee beans present in the inner space are passed to the outlet 11 under the influence of gravity. As can be seen, the outlet 11 may be provided near the circumferential wall 3A, or at least side of the package 3, so that the lower boundary 3D can taper in the direction of the circumferential wall 3A. The package 3 can comprise, for example, a bottom cover 18 which is provided with the above-mentioned sloping lower boundary 3D and outlet 11. The bottom cover 18 may also be provided with a closure 12A with a passage 12D, for example as already described hereinabove, while the closure 12A can comprise a rotary disc which is rotatable with respect to the outlet 11 and/or the rest of the package 3. During production of the package 3, the bottom cover 18 can be attached to circumferential wall 3A. Comparably to what has already been described hereinabove, through operating the closure 12A, the passage 12D can be brought at least partly into a condition overlapping with the outlet 11, so that the package 3 can deliver coffee beans.

Figure 5A:
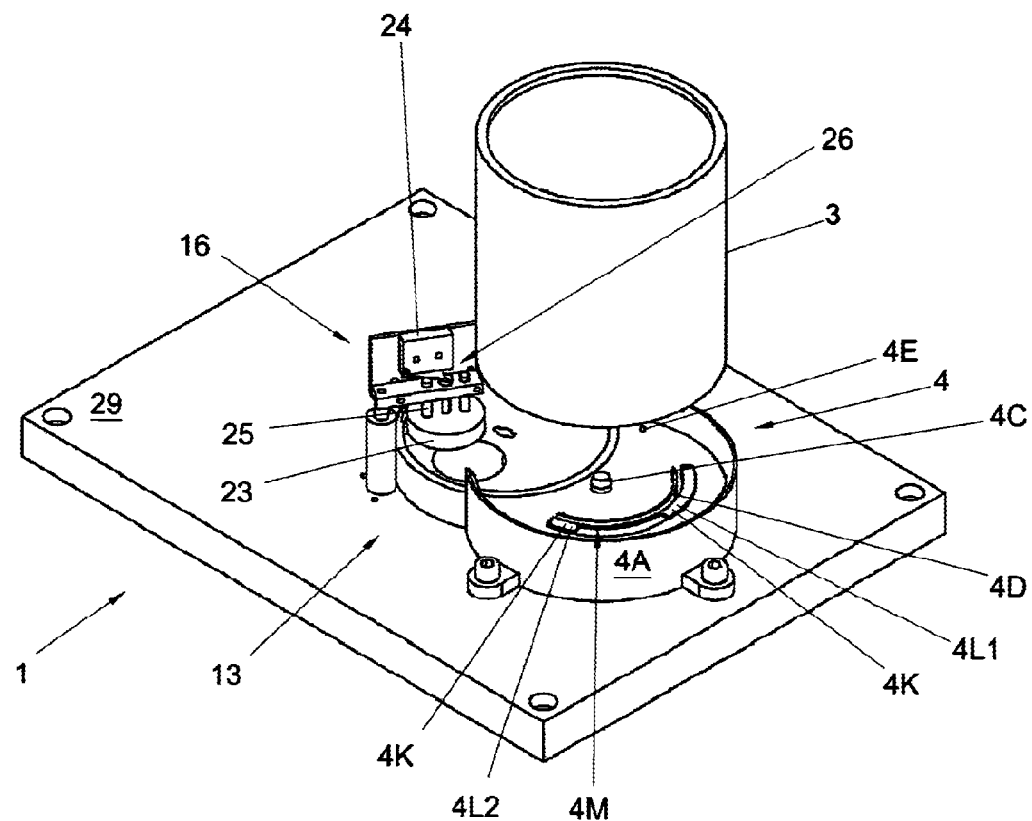
FIG. 5A shows in perspective a part of a coffee bean dosing system prior to coupling of a coffee bean package with the apparatus.

A further elaborated embodiment of a dosing system 1 can be described with reference to FIGS. 5A-H, in which a dosing system 1 is shown in different steps and views. FIG. 5A shows the system 1, where the package 3 is held above the connecting device 4, the package 3 not being coupled with the connecting device 4 yet. In particular, FIG. 5A shows a test setup of the dosing device 13, which is coupled with a support 29, while in practice the dosing device 13 could be part of a dosing apparatus, in particular a coffee making apparatus 2.

The connecting device 4 is preferably provided with guide parts so that the package 3 can only in one predetermined orientation be coupled with the apparatus 2. The package 3 may be provided with corresponding guide parts. The connecting device 4 comprises, for example, a holder wall 4A for guiding the circumferential wall 3A of the package 3. Preferably, the holder wall 4A has the shape of a part of a cylinder for at least partly surrounding at least a cylindrical lower part of the package 3. The connecting device 4 can further comprise cams 4C, 4D, 4E, 4K and/or holes, which connect to corresponding holes 4B, 4F, 4G and/or cams, respectively, of the package 3, which are preferably provided in and/or near the bottom 3C of the package 3, as can be seen in FIGS. 5A-5C.

Figure 5B:
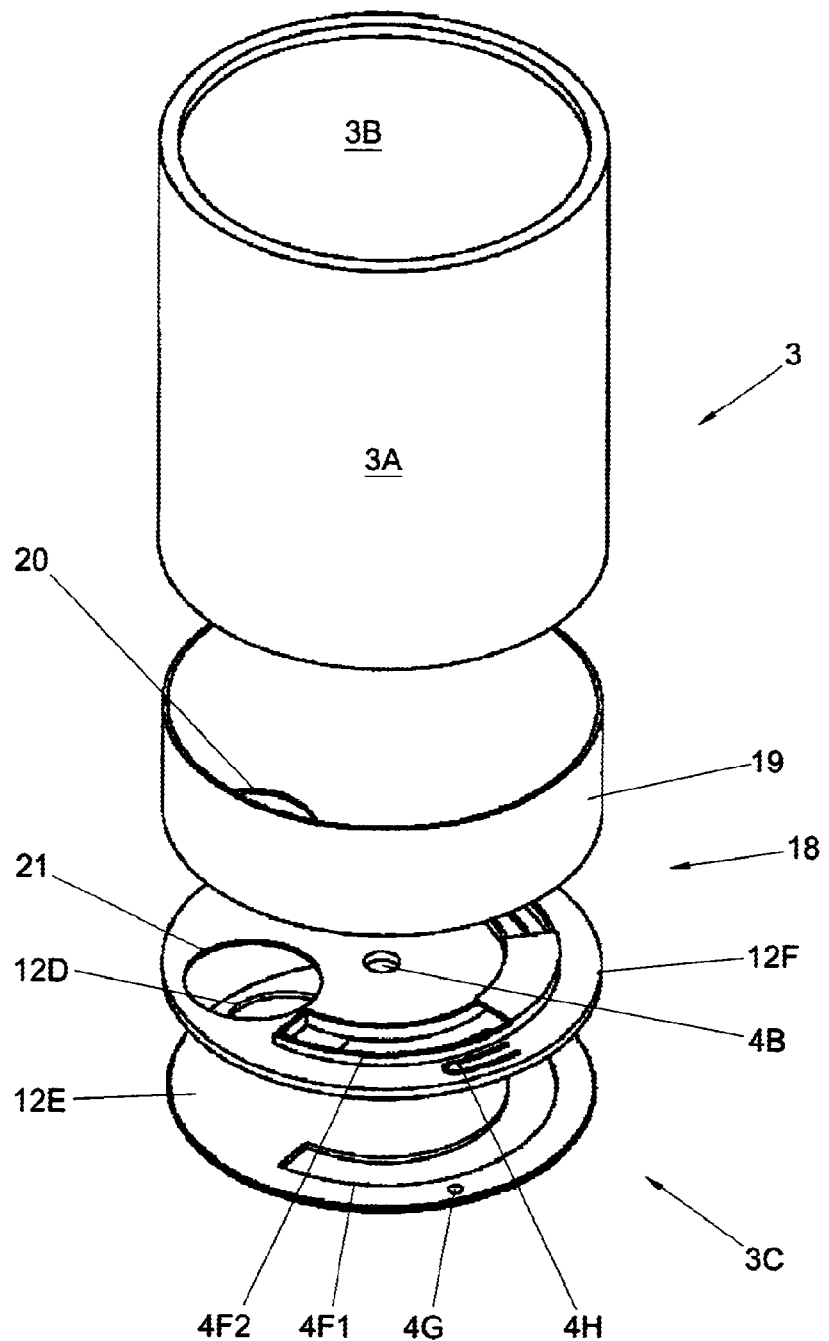
FIG. 5B shows an exploded view in perspective of the coffee bean package of the system of FIG. 5A.
Figure 5C:
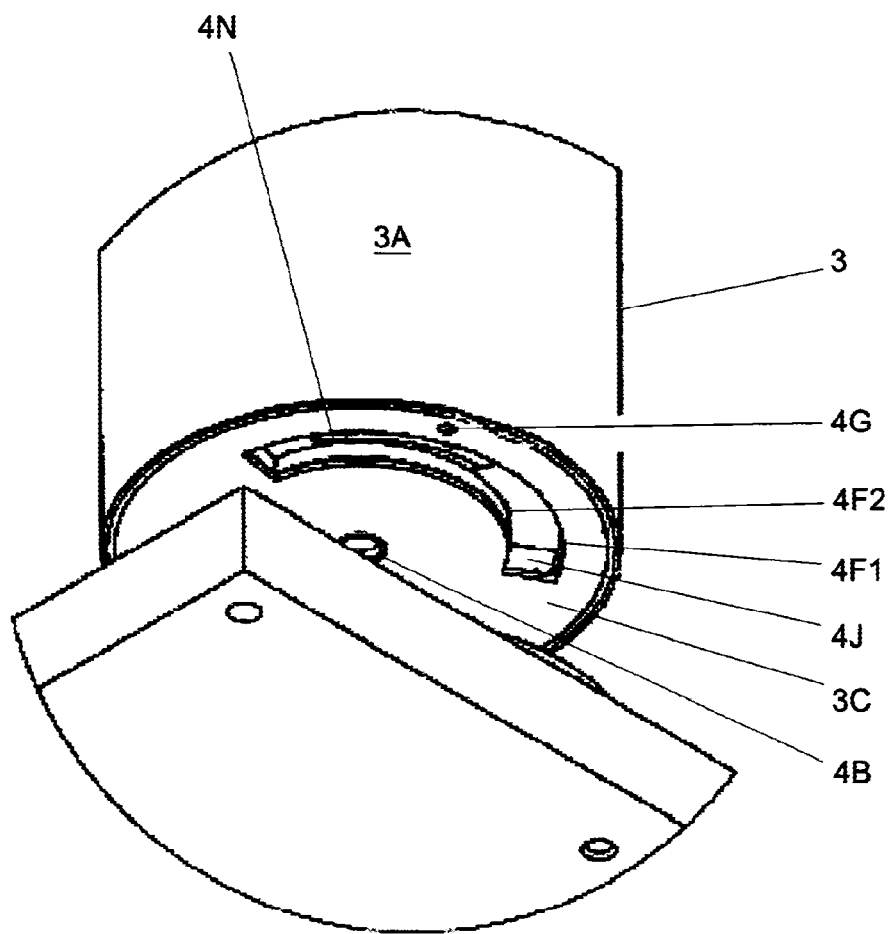
FIG. 5C shows a bottom view in perspective of the coffee bean package from FIGS. 5A and 5B.

The package 3 is provided, for instance, with a bottom cover 18, which bottom cover 18 can comprise a funnel 19, a rotary disc 12E, and a second disc 12F, as is shown in FIG. 5B. The rotary disc 12E can extend under the second disc 12F. The second disc 12F extends, for example, between the funnel 19 and the rotary disc 12F, and is preferably fixedly positioned with respect to the funnel 19. The outlet 11 of the package 3, in this example, may be formed by an opening 20 in the funnel 19 and a corresponding opening 21 in the second disc 12F. The closure 12A can be formed by the rotary disc 12E. The rotary disc 12E is provided with a passage 12D. The rotary disc 12E can be rotatably arranged with respect to the second disc 12F and the funnel 19. The second disc 12F and the funnel 19 can be arranged fixedly with respect to each other, and with respect to the circumferential wall 3A. The second disc 12F, for reasons of production technique, may be produced separately from the funnel 19 and then be connected with the funnel 19 fixedly, at least in rotary direction. In an alternative embodiment, the second disc 12F forms, for instance, one part together with the funnel 19.

The connecting device 4 of the apparatus 2 may be provided with a connecting cam 4C, which is arranged to engage in an opening 4B in the center of the bottom 3C of the package 3, for example so that the package 3 can be positioned and rotated with respect to the dosing device 13. The opening 4B in the center of the bottom 3C of the package 3 can be provided, for example, in the rotary disc 12E and in the second disc 12F. The connecting device 4 can also be provided with a sliding guide 4D, which engages in a sliding opening 4F in the bottom 3C of the package 3. The sliding guide 4D and the sliding opening 4F can contribute to guidance of the package 3 with respect to the dosing device 13 in the rotary direction. Also, the edges of the sliding opening 4F can form a stop for the rotary disc 12E and/or the second disc 12F, so that these cannot be rotated further. The sliding opening 4F can comprise a first sliding opening 4F1, in the rotary disc 12E, and a second sliding opening 4F2, in the second disc 12F. Furthermore, the connecting device 4 may be provided with opening cams 4E, for engagement in corresponding unlocking openings 4G in the rotary disc 12E of the package 3. The holder wall 4A, connecting cam 4C, sliding guide 4D and/or the opening cams 4E can form guide parts of the apparatus 2, for coupling the package 3 with the apparatus 2 in a predetermined orientation. The opening 4B, sliding opening 4F, and unlocking openings 4G can form corresponding guide parts of the package 3.

The opening cams 4E can be part of the opening means of the apparatus 2. By guiding the opening cams 4E through the unlocking openings 4G of the package 3, for example, the rotary disc 12E and the second disc 12F are unlocked with respect to each other. Also, the rotary disc 12E may then be secured with respect to the connecting device 4. The second disc 12F may be provided with at least one spring element 4H, which spring element 4H may be provided at the underside with a locking cam 4I. The spring elements 4H can extend at the outer or inner side of the sliding opening 4F2 of the second disc 12F, as can be seen in FIGS. 5B and 5H. In an uncoupled condition of the package 3, the spring element 4H, in particular the locking cam 4I, extends at least partly in the unlocking opening 4G of the rotary disc 12E. As a result, the rotary disc 12E and the second disc 12F are locked with respect to each other. In this locked position, the outlet 11 is preferably closed off by the rotary disc 12E so that the package 3, in particular the outlet 11, closed off. By connecting the package 3 to the connecting device 4, the opening cams 4E of the connecting device 4 push through the unlocking openings 4G, preferably against the locking cams 4I, counter to the spring force of the spring elements 4H, so that the spring elements 4H, in particular the locking cams 4I, are pushed out of the unlocking openings 4G, and the rotary disc 12E is unlocked with respect to the outlet 11 and can be rotated. When the opening cams 4E engage in the unlocking openings 4G, the second disc 12F can be rotated with respect to the rotary disc 12E, for example manually, while the rotary disc 12E can be held in position with respect to the connecting device 4 by the openings cams 4E and/or the sliding guide 4D. In particular, the sliding guide 4D can serve as a stop, by which the rotary disc 12E is held in position. As a result, the outlet 11 can be rotated to above the passage 12D for releasing the outlet 11. Preferably, multiple opening cams 4E, corresponding unlocking opening 4G and corresponding locking cams 4I are provided, so that it may be relatively difficult for a user to open the outlet 11 manually when the package 3 is uncoupled from the apparatus 2.

In another embodiment, not shown, the opening means, in particular the opening cams 4E, are movably arranged, so that the rotary disc 12E can be rotated by the opening cams 4E, while the rest of the package 3 is held in position with respect to the apparatus 2 by the connecting device 4. For example, the package 3 is then opened in an automatic manner by the apparatus 2.

As already described, the sliding guide 4D, which in a connected condition of the package 3 projects through the sliding opening 4F, may be arranged as a stop to limit the rotation range of the second disc 12F with respect to the rotary disc 12E. The sliding guide 4D can comprise an upstanding wall, in the form of a part of the circumference of a circle, with the sliding openings 4F1, 4F2 having a corresponding shape, for allowing the sliding guide 4D to pass. For example, the package 3 may be rotated 60° after connection, until the outlet 11 overlaps the passage 12D, with the sliding guide 4D impeding further rotation of the package 3 with respect to the rotary disc 12E in that the sliding guide 4D abuts against an edge 4J of the second sliding opening 4F2 of the second disc 12F. Furthermore, the connecting device 4 may be provided, for example, with a second sliding guide 4K for guiding the rotary disc 12E, during placement of the package 3, by means of the first sliding opening 4F1 and/or for guiding the second disc 12F, when rotating the package 3, by means of the second sliding opening 4F2.

As can be seen in FIG. 5A, the second sliding guide 4K can comprise two first flanges 4L1, 4L2. Between the first flanges 4L1, 4L2 extends an opening 4M. The package 3, in particular the second disc 12F, is provided with a second flange 4N, corresponding to the first flanges 4L1, 4L2 (FIGS. 5C, 5H). When the package 3 is placed on the dosing device 13, the first flanges 4L1, 4L2 extend higher than the second flange 4N. Therefore the second flange 4N passes the two first flanges 4L1, 4L2 upon positioning of the package 3. The second flange 4N passes the two first flanges 4L1, 4L2 through the opening between the two first flanges 4L1, 4L2 and after the passage is situated below the level of the two first flanges 4L1, 4L2. After placement, the package 3, including the second disc 12F, can be rotated with respect to the rotary disc 12E, while the second flange 4N will extend under one of the first flanges 4L1, 4L2. As a result, the package 3 cannot be taken off the apparatus 2. The package 3 can only be taken off the apparatus 2 when the second flange 4N is situated between the two first flanges 4L1, 4L2, adjacent the opening between the first two flanges 4L1, 4L2. When the outlet 11, in the embodiment shown formed by the openings 20, 21 in the funnel 19 and the second disc 12F, respectively, extends above the dosing space 14B, the flanges 4L1, 4L2, 4N can hinder removal of the package 3 from the apparatus 2.

In an embodiment, the cams and/or guides 4G, 4H, 4K, 4D of the dosing device 13 can have multiple functions. A first function may be the guidance of the package 3 into the dosing device 13. A second function may be the securing of the package 3 with respect to the dosing device 13. A third function may be the opening and closing of the outlet 11 of the package 3. A fourth function may be activation of a detection system, which detection system activates the dosing device 13. For example, the dosing space 14 cannot be released until the package 3 engages the cams of the dosing device 13. For example, the cam 4K has different surfaces, while each surface can have a different function.

Figure 5D:
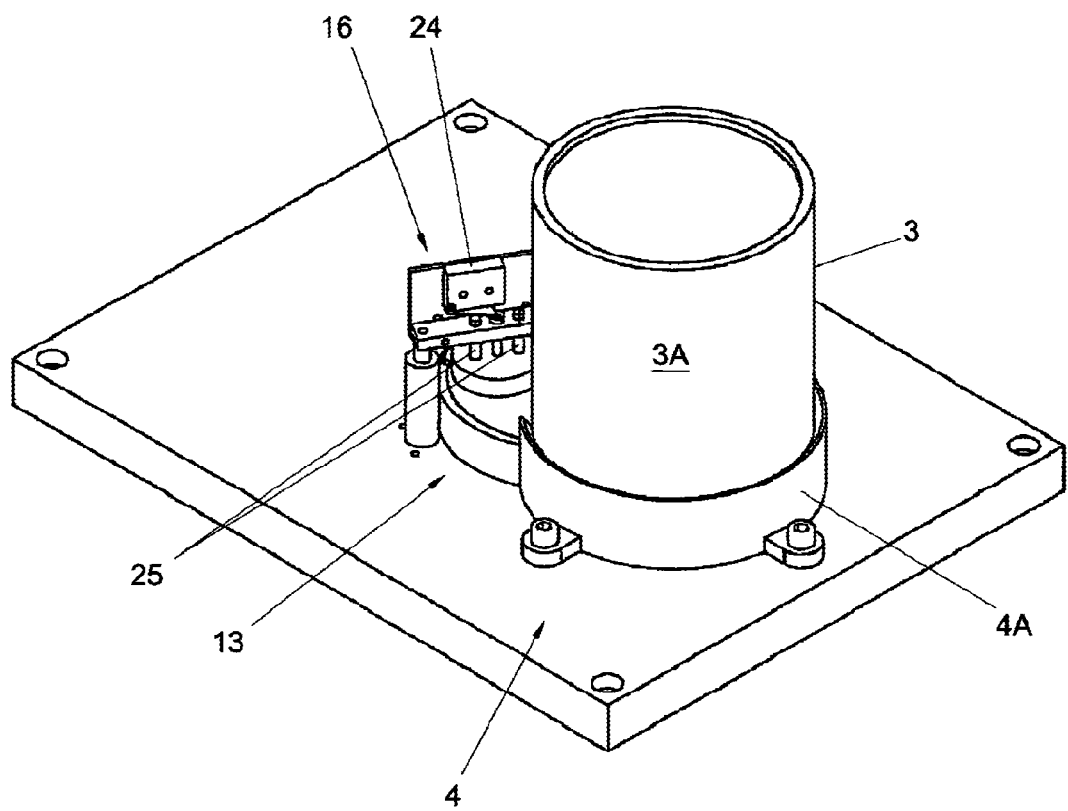
FIG. 5D shows in perspective the system of FIGS. 5A-5C, with the coffee bean package connected to the apparatus.

In FIG. 5D a part of the system 1 is shown in a coupled condition of the package 3, with the package extending within the holder wall 4A.

Figure 5E:
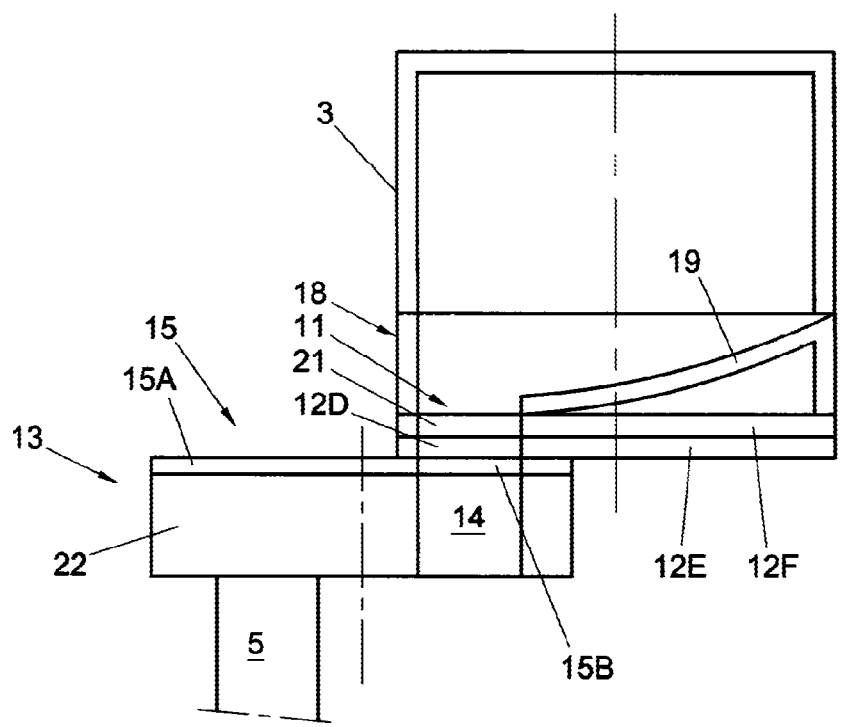
FIG. 5E shows schematically in side elevation a cross section of the system of FIGS. 5A-5D in a position for delivering beans from the package to the dosing space, for illustration without measuring device.

The dosing device 13 is preferably provided with a cutting disc 15A, which cutting disc 15A is provided with a second passage 15B (see FIG. 5E). Under the cutting disc 15A, a rotary element 22 may be provided, in which the dosing space 14 is provided. The cutting disc 15A and the rotary element 22 are preferably rotatably arranged with respect to each other.

Figure 5F:
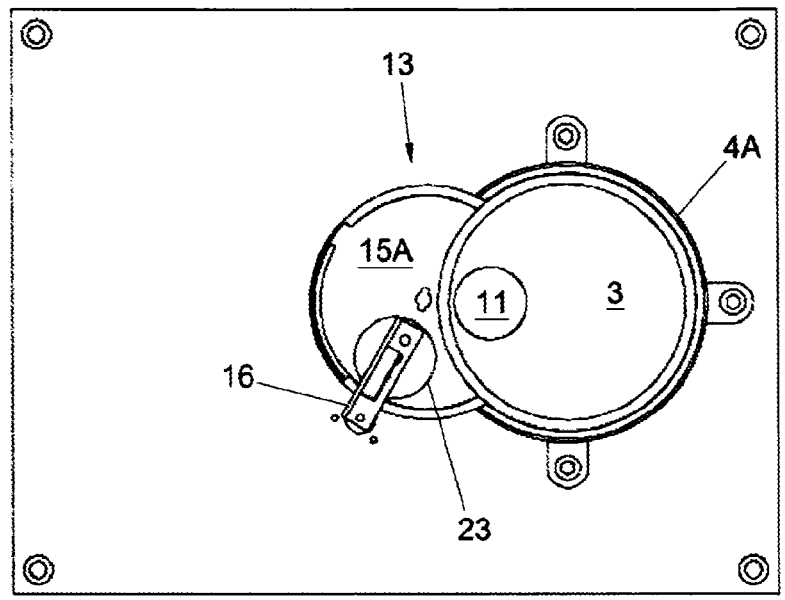
FIG. 5F shows in top plan view and partly in cross section the system of FIGS. 5A-5E, in a position for delivering beans from the package to the dosing space.

The cutting disc 15A is preferably arranged for closing off the dosing space 14 and cutting off coffee beans after the dosing space 14 is filled. The cutting disc 15A may be connected with a drive, for example, an electric motor, which drives the cutting disc 15A. As shown in FIG. 5F, a measuring device 16 may be provided for measuring whether or not the dosing space 14 is filled with a predetermined dose of coffee beans. In the position shown in FIG. 5E, the openings 11, 21, 12D, 15B in the funnel 19, the second disc 12F, the rotary disc 12E, and the cutting disc 15A, respectively, extend approximately above each other, and above the dosing space 14, so that coffee beans could be delivered from the inner space to the dosing space 14.

In a closed condition of the dosing space 14, the second passage 15B may be situated at a distance from the dosing space 14, so that the cutting disc 15A closes off the dosing space 14, and no coffee beans can be delivered to the dosing space 14. In FIG. 5F it is shown that the second passage 15B extends at a distance from the outlet 11 and/or passage 12D, so that no coffee beans can be delivered from the connected package 3 to the dosing space 14. In a delivery condition (FIG. 5E) the second passage 15B is positioned, for example, above the dosing space 14, and under the outlet 11 released by the passage 12D, so that the coffee beans can be passed into the dosing space 14. In a position where the dosing space 14 already extends under the outlet 11 and/or the passage 12D, the cutting disc 15A can clear the dosing space 14 for filling thereof and close it off.

Figure 5G:
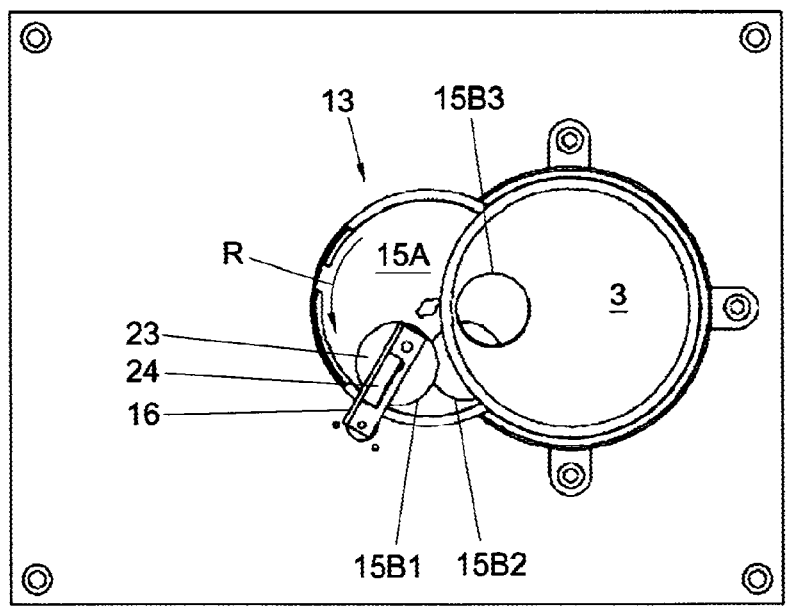
FIG. 5G shows in top plan view and partly in cross section the system of FIGS. 5A-5F, in different positions in which the cutting disc closes off the dosing space.
Figure 5H:
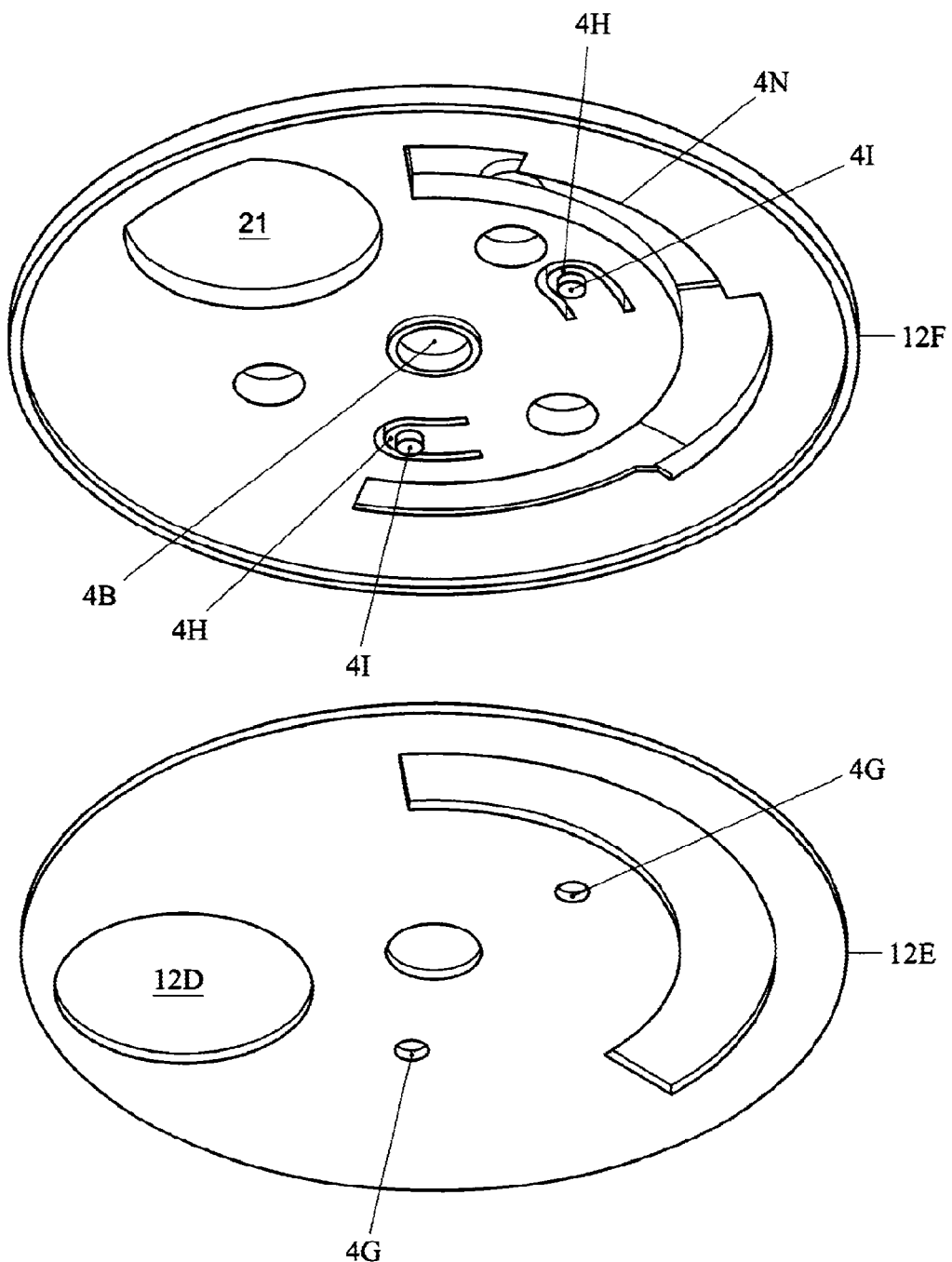
FIG. 5H shows an exploded perspective view of the rotary disc and the second disc.

In FIG. 5G it is shown how the cutting disc 15A can be rotated, by showing the second passage 15B in three positions. In a first position 15B1 the second passage 15B still extends near the measuring device 16. In a second position 15B2 the second passage 15B is moved in the direction of the outlet 11 and/or the dosing space 14. In a third position 15B3 the second passage 15B extend approximately under the outlet 11 and/or the passage 12D, so that the openings 11, 12D, 15B for passing-through of the beans from the package 3 to the dosing space 14 overlap each other and coffee beans can be passed to the dosing space 14. In an embodiment, the second passage 15B may be situated in the third position mentioned before the package 3 is connected, so that upon connection and rotation of the package 3 to open, the beans can be delivered directly. In another embodiment, the cutting disc 15A is not rotated into the third position until the package 3 has been connected and/or rotated to open.

After the dosing space 14 is filled, the cutting disc 15A and the second passage 15B are rotated back again from the third position 15B3 to the first position 15B1. During this reverse rotation, coffee beans that project at least partly above the dosing space 14 can be cut off or broken so that the beans do not block and/or hinder the closing means 12, in particular the shutoff means 15 and/or the closure 12A, more particularly the cutting disc 15A. The volume of the dosing space 14 may be so dimensioned that it contains a predetermined dose of coffee beans when it is wholly filled in a condition closed off by the shutoff means 15.

In an embodiment, the dosing space 14, after filling thereof, can rotate towards the measuring device 16, so that the measuring device 16 can be enabled to determine whether the dosing space 14 is filled with the predetermined dose. In a further embodiment, the dosing device 13 is so configured that the cutting disc 15A is rotated further through approximately 75°, for example by the drive 27, up to the measuring device 16, so that the dosing space 14 is closed off and the coffee beans are cut off, after which the cutting disc 15A can rotate further, being arranged upon continued further rotation to carry along the rotary element 22 at least until the dosing space 14 extends under the measuring device 16. Thereupon, the drive 27 will rotate the cutting disc 15A back to the measuring device 16, so that the measuring device 16 can have access to the beans in the dosing space 14.

The measuring device 16 can comprise a probe element 23, such as a stamp, which is movably arranged to move in the direction of the dosing space 14, at least when the dosing space 14 extends in a measuring position and has been released by the shutoff means 15. The dosing space 14 can extend, for example, in a measuring position when it extends approximately straight under the probe element 23. The measuring device 16 can also comprise a microswitch 24, and at least one probe element guide 25, which at least one probe element guide 25 is arranged to guide the probe element 23 through the second passage 15B and to a point near and/or into the dosing space 14. The measuring device 16 is so arranged that the probe element 23 can be guided as far as the coffee beans in a completely filled dosing space 14. The measuring device 16 can furthermore be designed with a contact element 26 (FIG. 5D). For example, by means of the contact element 26, the contact is interrupted when the probe element 23 moves on further than a predetermined height, which height corresponds to a filling of the dosing space 14 with a predetermined dose of beans, so that a signal is interrupted that corresponds to an incompletely filled space. When not the predetermined dose is measured, this can, for example, be communicated to the user via the indicator 17, so that the user, for example, can replace the package 3 and/or can verify whether the package 3 is indeed empty. Upon connection of a new package 3, or re-connection of the old package 3, the system 1 can, for example, be automatically activated again, so that the dosing space 14 can be replenished until the predetermined dose is measured. It will be clear that measuring whether the dosing space 14 is provided with the predetermined dose of coffee beans may also be done in other ways and/or places, for example, by means of other types of measuring devices and/or at a point under the outlet 11, respectively.

In a next step, the dosing device 13 can release the coffee beans from the dosing space 14 to the inlet 5, at least when it has been measured that the dosing space 14 was provided with the predetermined dose of beans. To this end, the rotary element 22 can position the dosing space 14, for example, above the inlet 5, at least position it such that the coffee beans are delivered from the dosing space 14 to the inlet 5, preferably under the influence of gravity. To this end, the rotary element 22 may be rotated further, for example, the rotary element 22 is carried along by the cutting disc 15A, which cutting disc 15A is driven by the drive 27, or the rotary element 22 is driven directly, until the second passage 15B and the dosing space 14 extend above the inlet 5. In FIG. 5H, the inlet 5 and the dosing space 14 are shown when they are connected to each other for delivering the coffee beans from the dosing space 14 to the inlet 5.

After the coffee beans have been supplied via the inlet 5 to the grinder 6, the cycle for delivering a predetermined dose of coffee beans from the package 3 to the grinder 6 can start again. The cutting disc 15A and the rotary element 22 can, for example, move back to the delivery position again, so that the beans can be delivered from the package 3 to the dosing space 14, at least in a coupled condition of the package 3 and a released condition of the outlet 11.

In an embodiment, the connecting device 4 is so arranged that the package 3 can be taken off solely when the outlet 11 is closed off by the closure 12A. For example, the package 3 can be taken off only in the same orientation as the orientation in which it was coupled with the apparatus 2. To that end, for example, the package 3 is to be rotated back so that the outlet 11 can be closed off again by the closure 12A. In another embodiment, after each dosage the package 3 is automatically rotated back by the apparatus 2, in particular the connecting device 4, so that the outlet 11 is closed off by the closure 12A.

In an embodiment, the dosing device 13 may be arranged to allow multiple predetermined coffee bean dosages to be set. For example, the dosing device 13 is provided with multiple dosing spaces 14 of different volumes, corresponding to different dosages. The dosing device 13 may then be arranged, for example, through operation of an operating element by the user, to deliver different predetermined coffee bean dosages, as desired, from one of the dosing spaces 14, to the grinder 6.

In particular embodiments, the coffee bean inlet 5 may for example be part of the grinder 6, as for instance shown schematically in FIG. 1, or comprise a separately arranged feed-through, such as shown, for example, in FIG. 2A. In illustration, in FIG. 2A the coffee bean inlet 5 is drawn as a kind of funnel.

In a further embodiment, not shown, the dosing device 13 is for instance part of the package 3. The dosing device 13 is arranged, for example, so as to extend, in use, under the outlet 11, and the dosing space 14 and the outlet 11 may then be movably arranged with respect to each other, for clearing and closing off the outlet 11 by the shutoff means 15.

The closing means 12 can be deployed for separating a dose of coffee beans delivered from the package 3, from the coffee beans in the package 3. After delivery of a dose of coffee beans, the closing means 12 can close off the outlet 11 and/or the dosing space 14. Therefore, in this description the closing means 12 can be regarded as a part of the dosing device 13.

In yet another embodiment, the inner space of the coffee bean package, when it has not been used before, comprises at least 20 grams, more particularly at least 50 grams, still more particularly at least 70 and still more particularly at least 200 grams of coffee beans. From this, multiple dosages of coffee beverage can be dosed. Since the coffee making apparatus may be suitable for preparing different kinds of coffee beverage in succession, that is, on the basis of different coffee beans kinds, it may be favorable to provide coffee bean packages of relatively small volumes. The coffee bean package may be disposable, which, for one thing, can be of benefit to convenience of use and can keep costs of production low. The package may be largely manufactured from environmentally friendly disposable, degradable or reusable material, e.g. foil, paper or cellulose. In another embodiment, the package 3 can comprise only one dose of coffee beans, so that the system after each connection of the package processes one dose of coffee beans, for preparing one consumption, for instance one cup of coffee beverage. It then holds, for example, that the inner space, when the package has not been used before, comprises an amount of coffee beans for preparing one consumption of coffee, such as a cup of coffee, preferably approximately 5-10 grams, more preferably approximately 6-8 grams of coffee beans.

In still another embodiment, the upper side of the package 3 may be open for supplying coffee beans to the inner space. For example, the upper side is permanently open, or the package 3 is provided with a detachable or hinged cover. The package 3 is therefore at least provided with a circumferential wall and a bottom.

In a further embodiment, the package 3, at least before use, is enclosed by a foil and/or a second package, which foil and/or second package prevents exchange of ambient air with coffee beans in the package 3. The foil and/or second package may be provided with a valve for degassing, for example in case of excess pressure that may arise in the foil and/or second package, for example in that gases are released from the coffee beans. The valve that may be provided in the package 3, and/or foil or second package around the first package 3 can be used to pump gases such as oxygen out of the package 3, and/or out of the foil or second package.

In an embodiment, the inner space and/or the wall of the package 3 may be provided with oxygen-absorbing material and/or a storage life prolonging gas.

The variations described and many comparable variations, as well as combinations thereof, are understood to be within the framework of the invention outlined by the claims. Evidently, different aspects of different embodiment and/or combinations thereof may be combined with each other and exchanged. Thus, there should be no limitation to just the embodiments mentioned.

The invention claimed is:

1. A system for dosing coffee beans, comprising
a coffee bean package provided with at least one wall which at least partly encloses an inner space for multiple dosages of coffee beans, and a coffee bean outlet for delivering coffee beans, and
an apparatus, provided with a coffee bean grinder,
a coffee bean inlet for supplying coffee beans from the coffee bean package to the grinder,
a connecting device for connecting and uncoupling the coffee bean package to the apparatus, so that the coffee bean outlet can be connected to the coffee bean inlet and uncoupled, and
a dosing device provided with a dosing space which is arranged for feeding-through one predetermined dose of coffee beans from the coffee bean outlet to the coffee bean inlet,
wherein the dosing device is provided with closing means for closing off the coffee bean outlet of the coffee bean package,
wherein the closing means comprises a reclosable closure, wherein the coffee bean package is provided with the reclosable closure for closing off the coffee bean outlet, and
wherein the closure comprises a rotary disc which in a condition connected with the apparatus can be rotated with respect to the outlet, wherein the connecting device is arranged for engagement of the closure, and to stop the closure while the outlet is moved with respect to the closure, so that the outlet in connected condition is released, or closed off.

2. The system according to claim 1, wherein the dosing device is arranged for closing off the coffee bean outlet after feeding-through the dose of coffee beans.

3. The system according to claim 1, wherein the dosing device is at least partly movably arranged with respect to the coffee bean outlet for separating a dose of coffee beans in the dosing space from the coffee beans in the package.

4. The system according to claim 3, wherein the dosing device comprises a rotary element.

5. The system according to claim 1, wherein, when the coffee bean package is connected to the apparatus, the dosing device is arranged so that the dosing space in a first position is coupled with the coffee bean outlet, such that coffee beans can be delivered from the package to the dosing space, and in a second position is coupled with the coffee bean inlet, such that coffee beans can be supplied from the dosing space to the grinder, wherein in the second position the coffee bean outlet is closed off.

6. The system according to claim 1, wherein the system is arranged so that the dose of coffee beans is supplied to the grinder under the influence of gravity, at least when the coffee bean package is coupled to the apparatus.

7. The system according to claim 1, wherein the closing means comprise shutoff means, wherein the apparatus is provided with the shutoff means to close off the coffee bean outlet, or to release it so that the outlet is coupled with the dosing space, such that coffee beans can be delivered from the outlet to the dosing space.

8. The system according to claim 7, wherein the shutoff means are provided with a cutting edge.

9. The system according to claim 1, wherein the closure is provided with a valve with a passage, wherein the valve and the passage are movably arranged with respect to the outlet, so that the outlet is closed off by the valve, or is released in that the passage at least partly overlaps the outlet, so that a predetermined dose of coffee beans can be delivered through the outlet to the dosing space.

10. The system according to claim 1, wherein the connecting device is arranged to unlock the closure when the package is connected to the apparatus.

11. The system according to claim 1, wherein the connecting device is provided with at least one unlocking cam for engagement of the closure, wherein the unlocking cam is arranged to stop the closure while the rest of the package is rotated, so that the outlet is released or closed off by the closure.

12. The system according to claim 1, wherein the connecting device comprises a switch for switching on the apparatus, wherein the package is provided with a stop near the underside of the package, which stop has a fixed position with respect to the outlet, wherein the stop is arranged to activate the switch when the outlet is rotated with respect to the closure into a position approximately above the dosing space.

13. The system according to claim 1, wherein the apparatus is provided with a first flange, wherein the package is provided near the underside with a second flange, which second flange has a fixed position with respect to the outlet, wherein the flanges are so arranged that upon rotation of the outlet with respect to the closure the flanges are guided over each other, wherein the first flange is arranged, in a connected and slightly rotated condition of the package on the apparatus, to engage on top of the second flange for locking the package on the apparatus at least in one direction.

14. The system according to claim 1, wherein the apparatus is provided with a cam, which cam is arranged to guide the package upon connection and/or rotation, and which cam is connected with a detection system for enabling activation of the apparatus when the package is connected to the apparatus.

15. The system according to claim 1, wherein the inner space on the inner side tapers at least slightly in the direction of the coffee bean outlet for guiding the coffee beans in the inner space to the coffee bean outlet.

16. The system according to claim 1, wherein the dosing device is furthermore provided with a measuring device which is at least arranged for determining whether the dosing space contains approximately the predetermined dose of coffee beans.

17. The system according to claim 16, wherein the dosing device is so arranged that the dosing space after supply of the coffee beans is moved to the measuring device for determining whether the dosing space contains approximately the predetermined dose of coffee beans.

18. The system according to claim 16, wherein the system is provided with an indicator for at least representing whether or not the dosing space is filled approximately according to the predetermined dose.

19. The system according to claim 1, wherein the coffee bean package is provided with guide parts for guiding and/or coupling the package into and/or with the connecting device, respectively.

20. The system according to claim 1, wherein the upper side of the package is open, and/or is provided with a detachable cap.

21. The system according to claim 1, wherein the cam is arranged to lock the package against the apparatus.

22. A system for dosing coffee beans, comprising
a coffee bean package provided with at least one wall which at least partly encloses an inner space for multiple dosages of coffee beans, and a coffee bean outlet for delivering coffee beans, and
an apparatus, provided with a coffee bean grinder,
a coffee bean inlet for supplying coffee beans from the coffee bean package to the grinder,
a connecting device for connecting and uncoupling the coffee bean package to the apparatus, so that the coffee bean outlet can be connected to the coffee bean inlet and uncoupled, and
a dosing device provided with a dosing space which is arranged for feeding-through one predetermined dose of coffee beans from the coffee bean outlet to the coffee bean inlet,
wherein the dosing device is at least partly movably arranged with respect to the coffee bean outlet for separating a dose of coffee beans in the dosing space from the coffee beans in the package, and
wherein the dosing device comprises a rotary element.

23. A system for dosing coffee beans, comprising
a coffee bean package provided with at least one wall which at least partly encloses an inner space for multiple dosages of coffee beans, and a coffee bean outlet for delivering coffee beans, and
an apparatus, provided with a coffee bean grinder,
a coffee bean inlet for supplying coffee beans from the coffee bean package to the grinder,
a connecting device for connecting and uncoupling the coffee bean package to the apparatus, so that the coffee bean outlet can be connected to the coffee bean inlet and uncoupled, and
a dosing device provided with a dosing space which is arranged for feeding-through one predetermined dose of coffee beans from the coffee bean outlet to the coffee bean inlet,
wherein, when the coffee bean package is connected to the apparatus, the dosing device is arranged so that the dosing space in a first position is coupled with the coffee bean outlet, such that coffee beans can be delivered from the package to the dosing space, and in a second position is coupled with the coffee bean inlet, such that coffee beans can be supplied from the dosing space to the grinder, wherein in the second position the coffee bean outlet is closed off.

* * * * *